United States Patent [19]
Lamping et al.

[11] Patent Number: 5,619,632
[45] Date of Patent: Apr. 8, 1997

[54] DISPLAYING NODE-LINK STRUCTURE WITH REGION OF GREATER SPACINGS AND PERIPHERAL BRANCHES

[75] Inventors: John O. Lamping, Los Altos; Ramana B. Rao, San Francisco, both of Calif.

[73] Assignee: Xerox Corporation, Stamford, Conn.

[21] Appl. No.: 306,074

[22] Filed: Sep. 14, 1994

[51] Int. Cl.⁶ ................................................. G06T 11/00
[52] U.S. Cl. ........................ 395/141; 395/326; 395/356
[58] Field of Search ...................................... 395/133, 140, 395/141, 155–161, 152, 600, 650

[56] References Cited

U.S. PATENT DOCUMENTS

| | | | |
|---|---|---|---|
| 4,528,643 | 7/1985 | Freeny, Jr. | 364/900 |
| 4,710,763 | 12/1987 | Franke et al. | 340/723 |
| 5,295,243 | 3/1994 | Robertson et al. | 395/160 |
| 5,297,241 | 3/1994 | Hirr, Jr. et al. | 395/127 |
| 5,333,254 | 7/1994 | Robertson | 395/155 |
| 5,337,404 | 8/1994 | Baudelaire et al. | 395/141 |
| 5,339,390 | 8/1994 | Robertson et al. | 395/157 |
| 5,384,908 | 1/1995 | Mackinlay et al. | 395/152 |
| 5,408,596 | 4/1995 | Nonaka et al. | 395/140 |
| 5,428,744 | 6/1995 | Webb et al. | 395/164 |
| 5,515,488 | 5/1996 | Hoppe et al. | 395/140 |
| 5,522,022 | 5/1996 | Rao et al. | 395/140 |

FOREIGN PATENT DOCUMENTS

| | | |
|---|---|---|
| 260144A2 | 3/1988 | European Pat. Off. . |
| 2139846 | 11/1984 | United Kingdom . |

OTHER PUBLICATIONS

Munzner, T., and Burchard, P., "Visualizing the Structure of the World Wide Web in 3D Hyperbolic Space," hardcopied from Web site URL http://www.geom.umn.edu:80/docs/research/webviz/and following sequence of nodes, dated Nov. 21, 1995, also published in *Proceedings of VRML.* '95, (San Diego, CA, Dec. 14–15, 1995), special issue of *Computer Graphics,* ACM SIGGRAPH, New York, 1995, pp. 33–38.

Munzner, T., Chi, E.H., and Burchard, P., "Visualization through the World Wide Web with Geomview, Cyberview, W3Kit, and WebOOGL," a single page hardcopied from the Web site designated by the URL http://www.ncsa.uiuc.ed u/SDG/IT94/Proceedings/VR/munzner/munzner–abstract.html.

Hardcopy of changes file from the Web site designated by the URL http://www.geom.umn.ed u/software/download/geomview.html, bearing date Oct. 21, 1994.

(List continued on next page.)

*Primary Examiner*—Almis R. Jankus

[57] ABSTRACT

Node-link data defining a node-link structure are used to present a sequence of representations on a display. The last representation in the sequence is perceptible as a changed continuation of the first. Each representation includes bounded node features, each with a center of area and a nearest node spacing that define a mid-spacing circle. All mid-spacing circles together determine an outer convex hull enclosing a total area for the representation. The mid-spacing circles of a subset of more spaced node features determine an inner convex hull enclosing approximately half the total area and enclosing a region in which nearest node spacings are in general perceptibly greater than in another region outside the second convex hull. The node features also represent a peripheral branch with lower level nodes that are not represented by more spaced node features. In the peripheral branch, node features that share a parent have centers of area positioned approximately along an arc with sufficiently similar spacings from the center of area of the parent node feature and from adjacent node features that they are perceptible as a group of related node features. The inner convex hulls of the first and last representations include subsets of node features representing different sets of nodes. The sequence can produce a perception that one node feature's nearest node spacing increases while another's decreases. The representations can be presented by a series of iterations, and can be presented at animation speeds to produce a perception of continuously moving node features.

22 Claims, 21 Drawing Sheets

OTHER PUBLICATIONS

"Visual Recall—Sophisticated document management and visualization technology for NetWare workgroups," Xerox Corporation, 1994.

Vizard, M., "Document manager taps data visualizer," *PC Week*, Apr. 18, 1994, pp. 63, 66.

"The Latest Word—XSoft brings document management to PCs," *The Seybold Report on Desktop Publishing*, vol. 8, No. 8, Apr. 4, 1994, pp. 29 and 30.

Bertin, J., *Semiology of Graphics—Diagrams Networks Maps*, Berg, W.J., Trans., Madison, Wis.: U. of Wisconsin Press, 1983, pp. 269–283.

Levy, S., "Automatic Generation of Hyperbolic Tilings," in Emmer, M., Ed., *The Visual Mind: Art and Mathematics*, Cambridge, Mass.: MIT Press, 1993, pp. 165–170.

Rigby, J.F., "Compound Tilings and Perfect Colourings," in Emmer, M., Ed., *The Visual Mind: Art and Mathematics*, Cambridge, Mass.:MIT Press, 1993, pp. 177–186.

Farrand, W.A., "Information Display in Interactive Design," Ph.D. Thesis, Department of Engineering, University of California Los Angeles, 1973.

Leung, Y.K., "A Review and Taxonomy of Distortion-Oriented Presentation Techniques," *ACM Transactions on Computer-Human Interactions*, vol. 1, No. 2, Jun. 1994, pp. 126–160.

Koike, H., and Yoshihara, H., "*Fractal Approaches for Visualizing Huge Hierarchies,*" *Proceedings of 1993 IEEE/CS Symposium on Visual Languages, Aug. 24–27, 1993*, IEEE, 1993, pp. 55–60.

Johnson, B., and Schneiderman, B., "Tree–Maps: A Space–Filling Approach to the Visualization of Hierarchical Information Structures," *Proceedings of the 2nd International IEEE Visualisation Conference*, New York: IEEE, 1991, pp. 284–291.

Schneiderman, B., "Tree Visualization with Tree–Maps: 2–d Space–Filling Approach," *ACM Transactions on Graphics*, vol. 11, No. 1, Jan. 1992, pp. 92–99.

Furnas, G.W., "Generalized Fisheye Views," *Proceedings of ACM CHI '86 Conference on Human Factors in Computing Systems*, 1986, pp. 16–23.

Sarkar, M., and Brown, M.H., "Graphical Fisheye Views of Graphs," Proceedings of ACM CHI '92 Conference on Human Factors in Computing Systems, 1992, p. 83–91.

Beier, T., and Neely, S., "Feature–Based Image Metamorphosis," SIGGRAPH '92, Chicago, *Computer Graphics Proceedings*, vol. 26, No. 2, Jul. 1992, pp. 35–42.

Sederberg, T. W., and Parry, S. R., "Free–Form Deformation of Solid Geometric Models," SIGGRAPH '86, Dallas, *Computer Graphics Proceedings*, vol. 20, No. 4, Aug. 1986, pp. 151–160.

Wolberg, G., *Digital Image Warping*, IEEE Computer Society Press, Los Alamitos, California, 1990, pp. 1–10, 222–240, and 301–314.

Fairchild, K.M., Poltrock, S.E., and Furnas, G.W., "SemNet: Three–Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201–233.

Tang, S.H., and Linton, M.A., "Pacers: Time–elastic objects," *Proceedings of the ACM Symposium on User Interface Software and Technology*, ACM Press, Nov. 1993, pp. 35–43.

Austin, J.D., Castellanos, J., Darnell, E., and Estrada, M., "An Empirical Exploration of the Poincaré Model for Hyperbolic Geometry," *Computer Graphics and Mathmatics Conference*, 1991, Mathmatics and Computer Education Journal, Winter 1993, vol. 27, No. 1, pp. 51–68.

Turo, D., and Johnson, B., "Improving the Visualization of Hierarchies with Treemaps: Design Issues and Experimentation," Proceedings of Visualization '92, IEEE, pp. 124–131.

Phillips, M., and Gunn, C., "Visualizing Hyperbolic Space: Unusual Uses of 4X4 Matrices," *Symposium Proceedings Interactive 3D Graphics*, ACM, 1992, pp. 209–214.

DISPLAYING NODE-LINK STRUCTURE WITH REGION OF GREATER SPACINGS AND PERIPHERAL BRANCHES

BACKGROUND OF THE INVENTION

The present invention relates to display of node-link structures.

Fairchild, K. M., Poltrock, S. E., and Furnas, G. W., "SemNet: Three-Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201–233, describe SemNet, a three-dimensional graphical interface. SemNet presents views that allow users to examine local detail while maintaining a global representation of the rest of a knowledge base. SemNet also provides semantic navigation techniques such as relative movement, absolute movement, and teleportation.

As shown and described in relation to FIG. 1—1, SemNet represents a knowledge base as a directed graph in a three-dimensional space, with elements of knowledge represented as labeled rectangles connected by lines or arcs. Page 207 notes the problem of assigning positions to knowledge elements so that the organization or structure of the knowledge base is maximally apparent to the user, and indicates that, while a general solution probably does not exist, a knowledge base may contain information that can be used to compute effective positions or a user may have information allowing the user to assign effective positions. Section 3.1 describes how mapping functions can map properties of elements to positions in three-dimensional space; section 3.2, on pages 209–213, describes proximity based functions, including multidimensional scaling and heuristics, that move related knowledge elements close together and unrelated knowledge elements far apart, and section 3.3, on pages 213–214, describes personalized positioning in which a user moves knowledge elements to positions, which can be combined with other positioning techniques.

Pages 214–222 describe strategies for large knowledge bases. Section 4.1 describes fisheye viewing strategies, including fisheye views from clusters, from three-dimensional point perspective, and from sampling density. Section 4.2 describes strategies for displaying arcs. Pages 223–228 describe navigation and browsing, including recognizing locations and controlling location, such as by relative movement, absolute movement, teleportation, hyperspace movement, and moving the space.

SUMMARY OF THE INVENTION

One aspect of the invention alleviates a basic problem in presenting node-link structures on a display. The information in a node-link structure tends to grow exponentially as one traverses the structure. For example, if the node-link structure is a tree or other hierarchical structure with a root node and levels of nodes below the root, the number of nodes, and therefore the amount of information in the tree, tends to increase exponentially as one goes from the root through the levels below the root. Exponential growth makes it difficult to present a node-link structure on a finite display.

Some conventional techniques map a node-link structure into a plane. Even though the mapped structure may be too large to present on a display in its entirety, a user can scroll around the plane to see parts of interest. These techniques therefore alleviate the exponential growth problem by showing only a small part of the information in a structure. To assist the user in navigating, such techniques may also present a small-scale representation of the mapped structure.

Other techniques, including the technique of Fairchild et al. described above, map a node-link structure into a three-dimensional space. Robertson et al., U.S. Pat. No. 5,295,243, describe techniques in which a hierarchical structure is presented in three-dimensional space with rotating substructures. As with structures mapped into a plane, a structure mapped into a three-dimensional space may be too large to present in its entirety; therefore, if the structure is viewed from a viewpoint within or near the structure, parts of the structure may be outside the field of view, alleviating the exponential growth problem. In addition, these techniques alleviate the exponential growth problem because some parts of a structure may obscure other parts, reducing the amount of information presented.

Other techniques, also described by Fairchild et al., provide fisheye views that display details near a focal point and only more important landmarks further away. Similarly, a user can prune or filter a structure to eliminate less interesting parts. Such techniques alleviate the exponential growth problem by selectively presenting information.

Each of the above techniques has its drawbacks. In general, it is not possible to uniformly map a complete node-link structure that grows exponentially into a Euclidean space. Even if the structure is truncated, uniformly mapping into a two-dimensional Euclidean plane is awkward—if leaf nodes are adequately spaced, then nodes near the root are far apart, obscuring high level structure and preventing display of the context of the entire tree. Mapping a node-link structure into a three-dimensional space is computationally expensive and only postpones the problem of exponential growth to a lower level of a structure. Techniques such as pruning, filtering, or the Fairchild et al. technique tend to sacrifice information about local or global context, interfering with navigation.

The techniques of the invention are based on the discovery of a way of avoiding these drawbacks. Each technique of the invention presents a sequence of representations of a node-link structure on a display. The last representation of the sequence is perceptible as a changed continuation of the first. Each representation includes bounded node features representing nodes, with each bounded node feature having a center of area that has a nearest node spacing from the center of area of a nearest other node feature. The center of area and nearest node spacing define a mid-spacing circle for the node feature that is centered at the center of area and has a diameter equal to the nearest node spacing. The mid-spacing circles of the bounded node features in each representation together determine a first convex hull that encloses a total area for the representation.

In the techniques of the invention, each representation also includes a subset of more spaced node features that determine a second convex hull for the representation. Each representation's second convex hull encloses approximately half the representation's total area. Each representation's second convex hull also encloses a region in which bounded node features have nearest node spacings that are in general perceptibly greater than in a region enclosed by the representation's first convex hull but outside the representation's second convex hull.

As a result of these features, a human viewing a representation can distinguish the region within the second convex hull from other regions of the representation even though the boundary may be indistinct. Due to the greater spacings, more information can be presented about node features in the second convex hull, such as information about content of the nodes they represent. Therefore, an experienced user can use the region of greater spacings to obtain information about content of a specific part of the node-link structure that is of particular interest.

At the same time, the techniques of the invention provide information about other parts of the node-link structure to assist a user in navigation or in other tasks that require information about context. The techniques provide this information by presenting node features in such a way that they are perceptible as groups of related node features. The techniques make use of the fact that nodes in a node-link structure can form branches, each with a top level node and lower level nodes, and each lower level node has a parent node at the next higher level to which it is related through one link.

The techniques present a branch in which the lower level node features are not in a representation's subset of more spaced node features, referred to as a peripheral branch, in a special way. The centers of area of lower level node features that share a parent node feature are positioned along an arc with sufficiently similar spacing from the parent node feature and from adjacent node features that they are perceptible as a group of related node features.

Finally, the techniques allow for change. The techniques present node features representing different sets of nodes in the second convex hulls of the first and last representations, so that the region of greater spacings in the last representation can show a different part of the node-link structure in than the first. Also, the sequence of representations produce a perception that at least one node feature's nearest node spacing increases and another's decreases from the first representation to the last.

The sequence of representations can be presented at a sufficient speed to produce a perception of continuous motion for node features. Such a speed is referred to herein as an "animation speed." To maintain an animation speed, some of the intermediate representations can include less detail than the first and last representations.

The techniques can, for example, present representations that are perceptible as a figure on a background, and the central area of the background can be the area in which each representation's region of greater spacings is presented. The background can, for example, be circular. The representations can include link features such as lines extending between related pairs of nodes. The node-link data can also include content data indicating content for each node, and each of a representation's more spaced node features can include characters or other graphical features indicating the node's content. The node-link structure can be an acyclic graph, such as a tree.

The techniques can be implemented by using the node-link data to obtain first node position data indicating positions of nodes represented in a first representation, then using the first node position data to present the first representation, then performing an iteration for each following representation. Each following representation's iteration can include using the first node position data to obtain the following representation's node position data indicating positions of nodes represented in the following representation, then using the following representation's node position data to present the following representation.

The techniques can be implemented by using the node-link data to obtain first node position data indicating positions of nodes represented in a first representation, then using the first node position data to present the first representation, then performing an iteration for each following representation. Each following representation's iteration can include using a preceding representation's node position data to obtain the following representation's node position data indicating positions of nodes represented in the following representation, then using the following representation's node position data to present the following representation. For example, because conformal mappings preserve angles, the following representation's node position data could be obtained by performing a conformal mapping of the positions indicated by the preceding representation's node position data.

The techniques can be implemented with a machine that includes memory, user input circuitry, a display, a processor, and node-link data stored in the memory. The techniques can also be implemented in an article of manufacture that includes a storage medium and data stored by the storage medium. The article of manufacture can be used in a machine that includes user input circuitry, a display, a storage medium access device, and node-link data stored in memory. The data stored by the storage medium can include instruction data that include data units stored in positions by the storage medium so that the storage medium access device provides the data units to the machine's processor in a sequence. The sequence of data units indicate instructions the processor executes. The above techniques can also be implemented in a method that operates a first machine to transfer instruction data indicating such instructions over a network to a second machine with a processor that executes the instructions.

In any of these implementations, a machine's processor can use the node-link data to provide first representation data causing the display to present a first representation of the node-link structure as described above.

The processor can receive user signal data from the user input circuitry indicating a change in the first representation. The processor can respond by automatically providing following representation data causing the display to present a sequence of at least one following representation of the node-link structure as described above, ending with a last representation that has a different set of nodes in its second convex hull than the first representation. Presentation of the first representation and the sequence of at least one following representation produces a perception that at least one node feature's nearest node spacing increases from the first representation to the last representation and that at least one other node feature's nearest node spacing decreases from the first representation to the last representation.

The techniques described above are advantageous because they avoid the drawbacks of conventional techniques. In comparison with mapping into a two-dimensional plane, the techniques can map an exponentially growing structure. In comparison with mapping into a three-dimensional space, the techniques are computationally simple, avoid three-dimensional occlusion and navigation and manipulation problems, and make it possible to map an exponentially growing structure. In comparison with techniques such as pruning, filtering, or those of Fairchild et al., the techniques preserve both local and global context, facilitating navigation. In general, the techniques provide intuitive presentations of a node-link structure within which navigation is easy. A user can quickly obtain presentation of any part of the node-link structure in a region of greater spacings through a series of intuitive signals. Additional detail about node features can be provided in the region of greater spacings. To maintain perception of continuity, a sequence of representations can be presented at animation speed. Detail of intermediate representations can be reduced as necessary to maintain speed.

The following description, the drawings, and the claims further set forth these and other aspects, objects, features, and advantages of the invention.

DETAILED DESCRIPTION

A. Conceptual Framework

Figure 1:
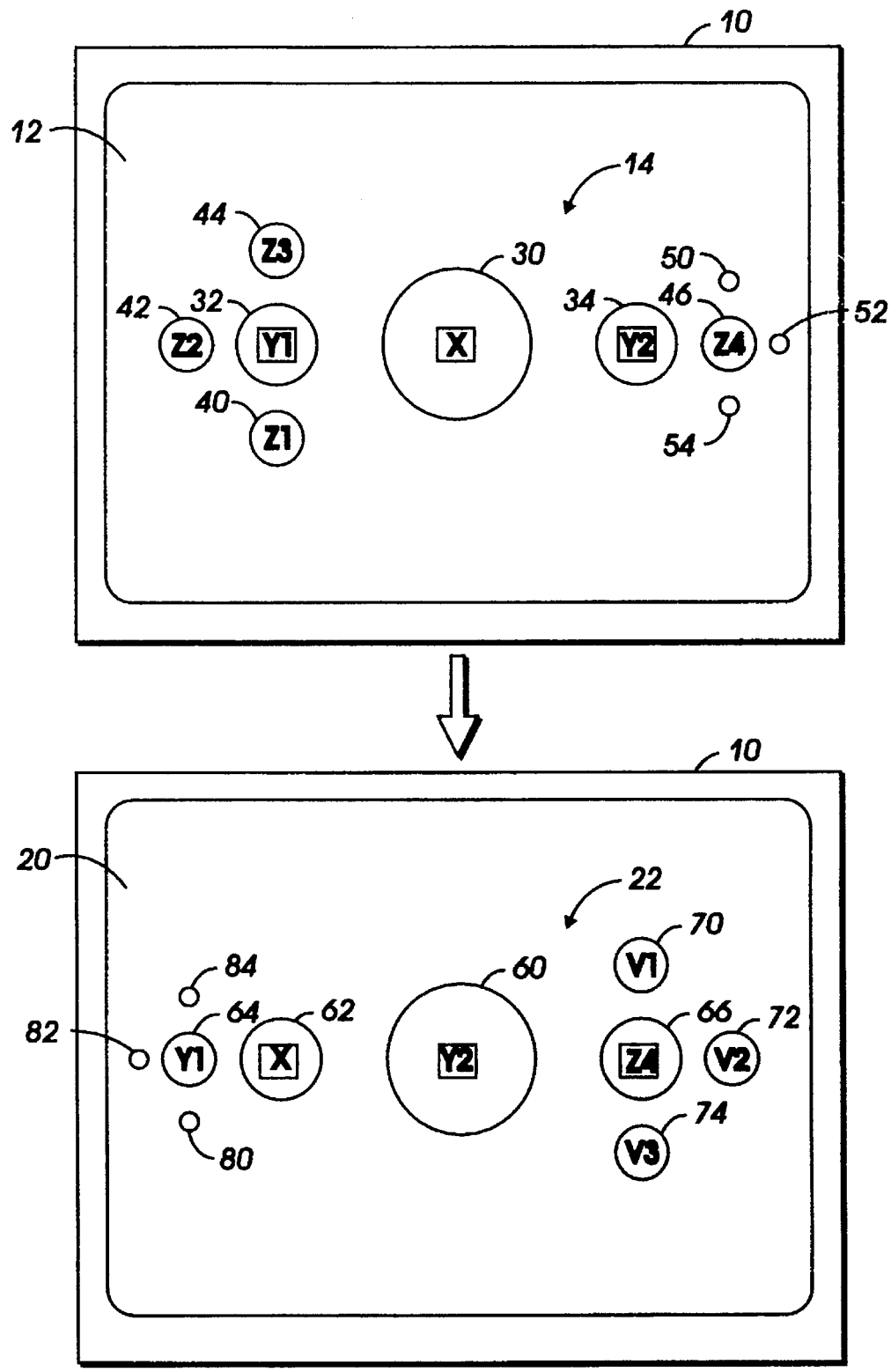
FIG. 1 is a schematic flow diagram showing a display presenting two representations of a node-link structure, each with a region of greater spacings and peripheral branches, but with the second perceptible as a changed continuation of the first.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low".

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A processor performs an operation or a function "automatically" when it performs the operation or function independent of concurrent human control.

Any two components are "connected" when there is a combination of circuitry that can transfer signals from one of the components to the other. For example, two components are "connected" by any combination of connections between them that permits transfer of signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory of input/output devices that permits the processor to access the item.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on.

An operation, such as an operation of a processor or other circuitry, "uses" an item of data when the manner in which the operation is performed depends on the value of the item.

An "instruction" is an item of data that a processor can use to determine its own operation. A processor "executes" a set of instructions when it uses the instructions to determine its operations.

A "program" is an item of data that indicates a sequence of instructions that a processor can execute.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

"User input circuitry" is circuitry for providing signals based on actions of a user. User input circuitry can receive signals from one or more "user input devices" that provide signals based on actions of a user, such as a keyboard or a mouse. The set of signals provided by user input circuitry can therefore include data indicating mouse operation and data indicating keyboard operation. Signals from user input circuitry may include a "request" for an operation, in which case a system may perform the requested operation in response.

An "image" is a pattern of physical light. An "image output device" is a device that can provide output defining an image. A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

When an image is a pattern of physical light in the visible portion of the electromagnetic spectrum, the image can produce human perceptions. The term "graphical feature", or "feature", refers to any human perception produced by, or that could be produced by, an image.

A "pointer" is a graphical feature that indicates a position within an image. A pointer is "at a position" when the pointer is indicating the position.

A "pointer control device" is a user input device that can be used to control position of a pointer within an image presented on a display. Examples of pointer control devices include a mouse, a joystick, a track ball, a portion of a keyboard with directional keys, and so forth. An action of a user "moves a pointer" if the action causes a pointer control device to provide signals causing a change in position of the pointer.

In general, an action by a user "indicates" a thing, an event, or a characteristic when the action demonstrates or points out the thing, event or characteristic in a manner that is distinguishable from actions that do not indicate the thing, event, or characteristic. The user can, for example, use a pointer control device such as a mouse to indicate a position by positioning a pointer at the position and clicking a button on the pointer control device while the pointer is at the position.

An image "shows" or "includes" a feature when the image produces, or could produce, a perception of the feature.

An item of data "defines" an image when the item of data includes sufficient information to produce the image, such as by presenting it on a display. An item of data "defines" a feature when the item defines one or more images that show or include the feature.

A "structure" is a group of items, all of which are related to form a unity. A "node-link structure" is a structure that includes items called nodes and links. Each link relates two or more of the nodes. Two nodes are "related through one link" or "related through a link" if the node-link structure includes a link that relates the two nodes. A link "relates a pair" of nodes if the link relates only two nodes.

A "graph" is a node-link structure in which each link relates two nodes. An "acyclic graph" is a graph in which the links provide only one path between any two nodes in the graph. A "directed graph" is a graph in which each link indicates direction between the nodes it relates, with one node being a source of the link and the other being a destination. A "tree" is an acyclic directed graph with exactly one root node such that every other node in the tree can be reached by only one path that begins at the root node and follows each link in the path in its indicated direction.

A "branch" of a node-link structure is a set of nodes that forms a tree within the node-link structure if the links are treated as relating pairs of nodes and as indicating direction. A branch therefore includes two or more levels, with the "top level node" being the node that is the root node of the tree and "lower level nodes" being nodes at one or more levels of the tree below the top level node. Each lower level node has a "parent node" at the next higher level to which the lower level node is related through one link. A parent node has a set of "child nodes" at the next lower level to each of which the parent node is related through one link. The child nodes of a parent "share" the parent node.

An item of data "defines" a node-link structure if the item of data includes information indicating how the links relate the nodes. For example, the item of data could include, for each link, an identifier of each of the nodes that it relates.

An item of data defining a node-link structure includes "content" if the item of data includes information about nodes or links other than information indicating how the links relate the nodes. For example, the item of data could include a name or other descriptive information for a node or for a link.

A graphical feature "represents" a node-link structure when the graphical feature itself includes features that map one-to-one with a set of nodes and links in the node-link structure. A feature that maps to a node "represents" the node and a feature that maps to a link "represents" the link. A "node feature" is a feature that represents only one node, and a "link feature" is a feature that represents only one link.

A "graphical representation" or "representation" is a graphical feature that includes elements that are spatially related in a configuration that represents information.

A "sequence of representations" is a sequence that includes at least two representations. A sequence of representations begins with a "first representation" and the first representation is followed by a "sequence of at least one following representation" that ends with a "last representation." Each following representation follows a "preceding representation." A sequence of representations may also include one or more "intermediate representations" between the first and last representations. A sequence of representations may include a "subsequence of representations" that is also a sequence of representations as defined above.

A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy."

The last representation of a sequence of representations is perceptible as a "changed continuation" of the first representation when the last representation is perceptible as a continuation of the first representation but with at least one change. An intermediate representation is similarly perceptible as an "intermediate changed continuation" of the first representation when the intermediate representation is perceptible as a continuation of the first representation but with at least one change.

An "animation loop" is a repeated operation in which each repetition presents an image and in which features in each image appear to be continuations of features in the next preceding image. If a user is providing signals through user input circuitry, the signals can be queued as events and each loop can handle some events from the queue. An "animation cycle" is a single iteration of an animation loop.

The "detail" with which an image is presented is the quantity of information in the presented image. Information in an image can be increased by providing additional lines or objects, by providing arcs rather than straight lines, and so forth. A "level of detail" is a value indicating one of a set of quantities of information in an image.

Speed of presentation of images is "maintained" when a sequence of images is presented without a reduction in speed of presentation.

A sequence of images is presented at a sufficient speed that features in the images are perceptible as a "continuously moving feature" if the images can provide the perception of a single feature that moves, and may also evolve, rather than the perception of a sequence of distinct features presented in succession. Such a speed is sometimes referred to as an "animation speed."

An operation includes a "sequence of iterations" when the operation includes a sequence of substantially similar sub-operations, each referred to as an "iteration," where each iteration after the first uses starting data produced by the preceding iteration to obtain ending data. Each iteration's ending data can in turn be used by the following iteration.

An item of data "defines" a representation when the item defines an image that includes the representation. A representation "is presented" when an image that includes the representation is presented. Providing data to a display "causes" presentation of a representation or sequence of representations when the display responds to the data by presenting the representation or sequence of representations.

A "region" of a representation is a bounded area of the representation; for example, a single point is the smallest possible region of any representation. A representation "includes" a feature or a region if presentation of the representation can produce perception of the feature or region.

A "representation of a node-link structure" is a graphical representation that represents the node-link structure. In a representation of a node-link structure, for example, link features can be lines, such as arcs or straight lines, that extend between node features. A representation of a node-link structure may also include graphical features that "indicate" content, such as words or other strings of characters from which a viewer can obtain information about a represented part of the structure.

A representation of a node-link structure is "perceptible as a figure on a background" if the representation includes a feature, referred to as the "figure," and the feature appears to be on or above a region that is not part of the figure, referred to as the "background."

A "bounded node feature" is a node feature that has a perceptible boundary. The "center of area" of a bounded node feature is the center of area of the region within the node feature's boundary. The position of a bounded node feature's center of area can therefore be computed from the node feature's boundary or estimated by viewing the representation.

The "nearest other node feature" of a first bounded node feature in a representation is a second bounded node feature whose center of area is spaced from the first node feature's center of area by a distance no greater than the spacing from the first node feature's center of area to any other bounded node feature's center of area. The distance is referred to herein as the node feature's "nearest node spacing." A bounded node feature may have more than one nearest other node feature, all with centers of area at the nearest node spacing. A bounded node feature's "mid-spacing circle" is a circle centered at the node feature's center of area with a diameter equal to the node feature's nearest node spacing, so that the center of area and nearest node spacing define the mid-spacing circle.

The "convex hull" determined by mid-spacing circles of two or more bounded node features in a representation is the smallest region that includes the mid-spacing circles and also includes every point on any straight line between two points in the region.

The "area of," or the "area enclosed by," a part of the representation is a measure of the part's two-dimensional extent.

A convex hull determined by mid-spacing circles of bounded node features in a representation encloses "a total area for the representation" if the mid-spacing circles of all bounded node features in the representation are included in the convex hull; such a convex hull may be referred to as an "outer convex hull." An "inner convex hull" is a convex hull determined by the mid-spacing circles of a subset of the bounded node features in a representation that encloses less than the total area for the representation. An inner convex hull encloses "approximately half the representation's total area" if the area enclosed by the inner convex hull is between approximately one-fourth and approximately three-fourths of the total area for the representation. A representation may include more than one subset of bounded node features with mid-spacing circles that determine an inner convex hull that encloses approximately half the representation's total area.

Bounded node features in a first region have nearest node spacings that are "in general perceptibly greater" than in a second region if a viewer can see that the nearest node spacings are generally greater in the first region than in the second. A region in which bounded node features have nearest node spacings that are in general perceptibly greater than in other regions of a representation may be referred to as a "region of greater spacings."

A set of "more spaced node features" in a representation of a node-link structure is a set of bounded node features that determines an inner convex hull that encloses approximately half the representation's total area and that also encloses a region in which bounded node features have nearest node spacings that are in general perceptibly greater than in a region outside the inner convex hull.

A "peripheral branch" in a node-link structure that is represented by a representation that includes a set of more spaced node features is a branch that includes lower level nodes that are not represented by node features in the set of more spaced node features.

Centers of area of node features in a representation are "positioned approximately along an arc" or are "positioned approximately along a circle" if an arc of an ellipse or a circle can be drawn within the representation such that each node feature's center of area is closer to the arc than to an adjacent node feature's center of area.

Lower level node features that share a parent node feature and whose centers of area are positioned approximately along an arc are positioned with "sufficiently similar spacings from the center of area of the parent node feature and with sufficiently similar spacings from adjacent node features along the arc that the lower level node features sharing the parent node feature are perceptible as a group of related node features" if the lower level node features together appear to a viewer to be a group.

Inner convex hulls in the first and last representations of a sequence include subsets of bounded node features that "represent different sets of node" if the set of bounded node features in the inner convex hull of the first representation and the set of bounded node features in the inner convex hull of the second representation are not identical.

A sequence of representations produces a perception that a node feature "has a nearest node spacing that increases from the first representation to the last representation" if a viewer can see that the node feature's nearest node spacing is larger in the last representation than in the first representation. Similarly, a sequence of representations produces a perception that a node feature "occupies a decreasing area from the first representation to the last representation" if a viewer can see that the node feature's nearest node spacing is smaller in the last representation than in the first representation.

B. General Features

Figure 2:
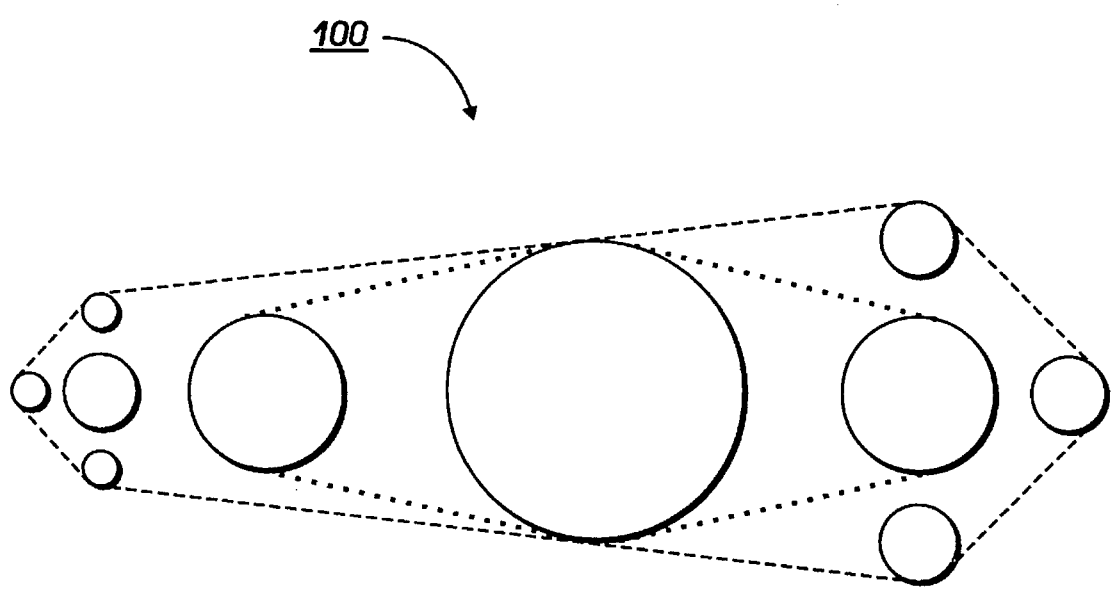
FIG. 2 is a schematic view showing how areas occupied by node features determine convex hulls.
Figure 3:
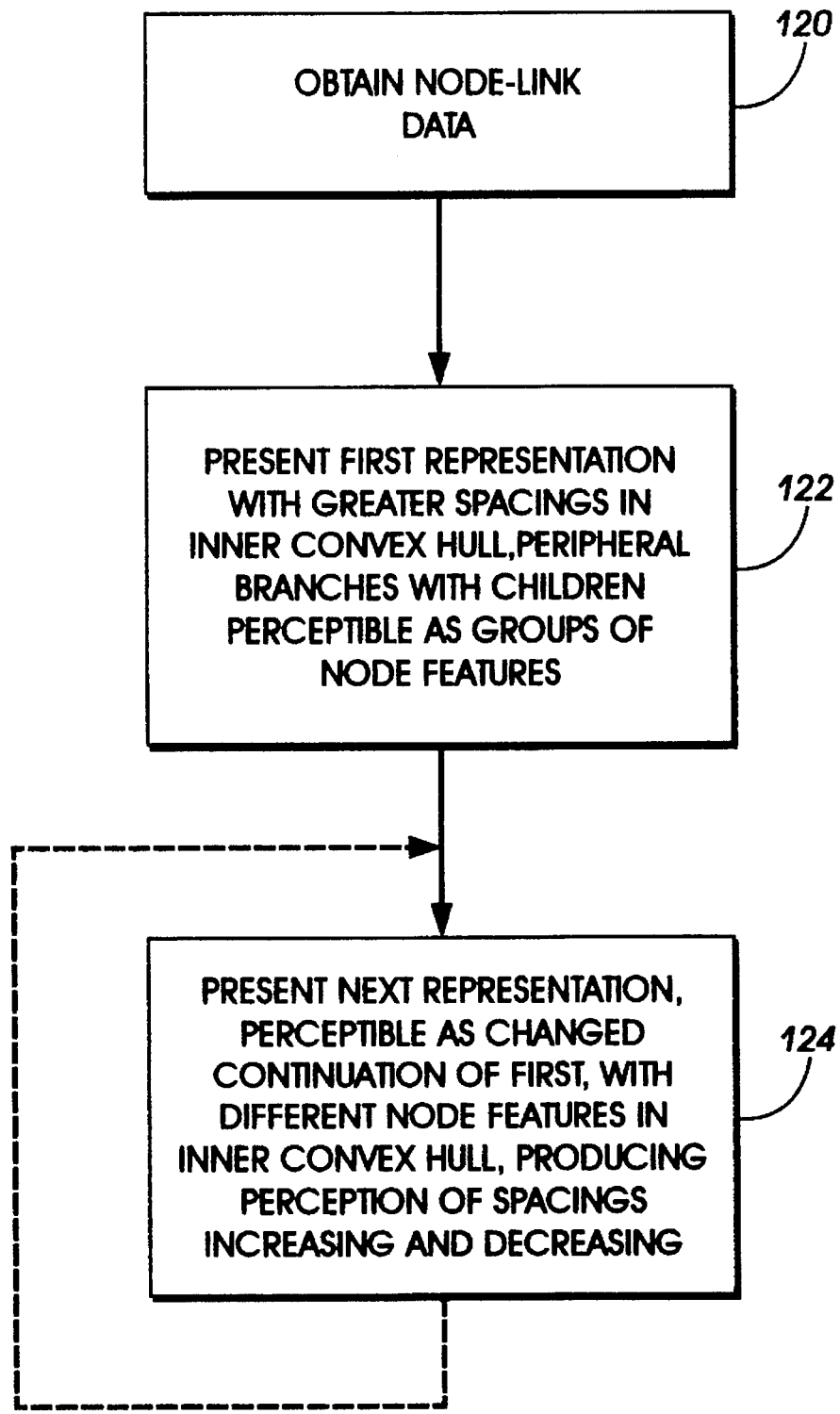
FIG. 3 is a flow chart showing general acts in presenting a sequence of representations like the one in FIG. 1.
Figure 4:
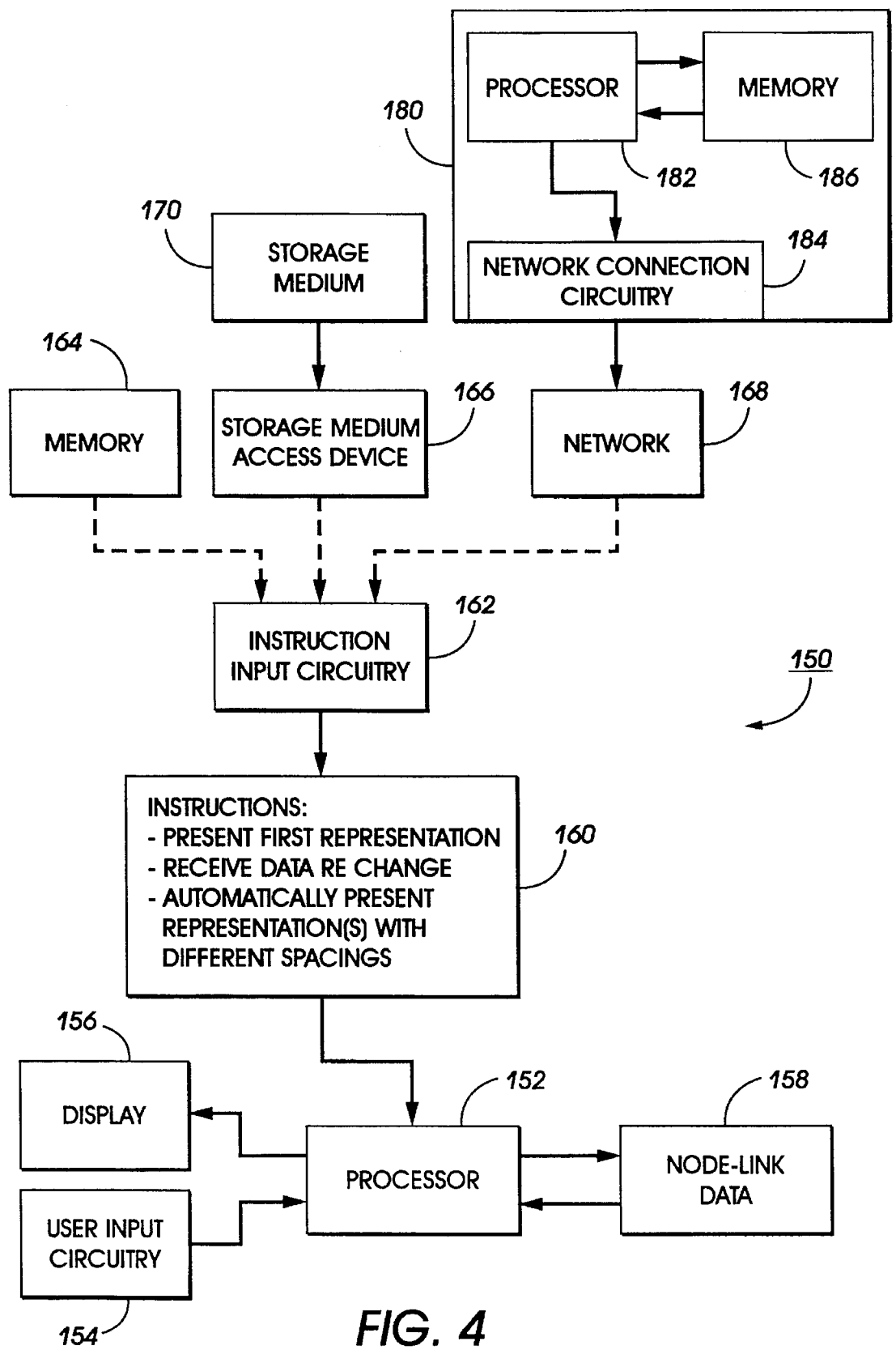
FIG. 4 is a schematic diagram showing general components of a machine that presents a sequence of representations like the one in FIG. 1.

FIGS. 1–4 show general features of the invention. FIG. 1 shows presentations of first and second representations of a node-link structure, each with a region of greater spacings and a peripheral branch. FIG. 2 shows how areas occupied by node features can determine convex hulls. FIG. 3 shows general acts in presenting a sequence of representations of the type shown in FIG. 1. FIG. 4 shows general components of a machine that presents such representations.

In FIG. 1, display 10 first presents image 12 showing representation 14 of a node-link structure, then presents image 20 showing representation 22 of the same node-link structure. Representations 14 and 22 each include node features that represent nodes in the node-link structure. Each node feature is a bounded node feature with a center of area and a nearest node spacing. The center of area and nearest node spacing define a mid-spacing circle with its center at the node feature's center of area and with a diameter equal to the nearest node spacing. Each node feature's boundary is illustratively shown as a circle that coincides with the node feature's mid-spacing circle, except that some of the most peripheral node features are shown as smaller circles because the node features that would be nearest to them are not shown.

The node features in representation 14 include node feature 30, with a larger nearest node spacing than other node features and representing a node with content indicated by an "X" in a square at the center of node feature 30. Node features 32 and 34 represent nodes with contents indicated respectively by "Y1" and "Y2", nodes that are related to the node represented by node feature 30 through one link. Similarly, node features 40, 42, and 44 represent nodes with contents indicated respectively by "Z1", "Z2", and "Z3", nodes that are related to the node represented by node feature 32 through one link; node feature 46 represents a node with content indicated by "Z4" that is related to the node represented by node feature 34 through one link; and node features 50, 52, and 54 represent nodes with contents not indicated, nodes that are related to the node represented by node feature 46 through one link.

The node features in representation 22 include node feature 60, with a larger nearest node spacing than other node features and representing a node with content indicated by an "Y2" in a square at the center of node feature 60. Node feature 62 represents a node with content indicated by "X" that is related to the node represented by node feature 60 through one link, and node feature 64 in turn represents a node with content indicated by "Y1" that is related to the node represented by node feature 62 through one link. Similarly, node feature 66 represents a node with content indicated by "Z4" that is related to the node represented by node feature 60 through one link; node features 70, 72, and 74 represent nodes with contents indicated respectively by "V1", "V2", and "V3", nodes that are also related to the node represented by node feature 66 through one link; and node features 80, 82, and 84 represent nodes with contents not indicated, nodes that are related to the node represented by node feature 64 through one link.

Although representations 14 and 22 are different, representation 22 can be perceived as a changed continuation of representation 14. Node feature 60 has the same content as node feature 34; node feature 62 the same as node feature 30; node feature 64 the same as node feature 32; and node feature 66 the same as node feature 46. In addition, even though their contents are not indicated in both representations, node features 70, 72, and 74 can be seen as a group of related node features that are the same as node features 50, 52, and 54, and node features 80, 82, and 84 can be seen as a group of related node features that are the same as node features 40, 42, and 44. FIG. 1 illustrates, however, that if representation 22 is perceived as a changed continuation of representation 14, the representations will also produce a perception that the nearest node spacing of node feature 34 increases and that the nearest node spacing of node feature 30 decreases.

In addition, representations 14 and 22 are both presented with a region of greater spacings and with at least one peripheral branch.

The region of greater spacings in representation 14 can be seen as including node features 30, 32, and 34, while the region of greater spacings in representation 22 can be seen as including node features 60, 62, and 66. Therefore, the regions of greater spacings in the two representations include node features that represent different nodes.

FIG. 2 illustrates how the part of a representation that includes a region of greater spacings in accordance with the invention can be distinguished from other parts of the representation. Representation 100 in FIG. 2 has node features bounded by mid-spacing circles as in representation 22 in FIG. 1. The mid-spacing circles of all the node features determine a first convex hull, indicated by the dashed line; the first convex hull includes all the mid-spacing circles in representation 100, so that the first convex hull encloses a total area for representation 100. The three largest mid-spacing circles, on the other hand, determine a second convex hull, indicated by the dotted line; the second convex hull encloses approximately half the total area and also encloses a region in which nearest node spacings are in general perceptibly greater than in a region enclosed by the first convex hull but outside the second convex hull.

Examples of peripheral branches in representation 14 include the branch with node features 32, 40, 42, and 44 and the branch with node features 46, 50, 52, and 54. Examples of peripheral branches in representation 22 include the branch with node features 64, 80, 82, and 84 and the branch with node features 66, 70, 72, and 74. In each representation, nearest node spacings are in general perceptibly greater in the region of greater spacings than in the peripheral branches. Also, children node features in the peripheral branches have centers of area positioned in order along an arc with sufficiently similar spacings from the center of area of their parent node feature and from adjacent children node features along the arc that they are perceptible as a group of related node features.

In FIG. 3, the act in box 120 begins by obtaining node-link data defining a node-link structure. The node-link structure includes nodes and links, with each link relating at least two nodes.

The act in box 122 uses the node-link data obtained in box 120 to present a first representation of the node-link structure. The first representation includes a region of greater spacings in which nearest node spacings are in general perceptibly greater than in another region, as described above. The first representation also includes peripheral branches in which node features that share a parent node feature are perceptible as a group of related node features, also as described above.

The act in box 124 then presents a next representation of the node-link structure. The next representation is perceptible as a changed continuation of the first representation. Like the first representation, the next representation includes a region of greater spacings in which nearest node spacings are in general perceptibly greater than in another region, as described above, but the regions of greater spacings of the representations include different subsets of node features. The next representation also includes peripheral branches in which node features that share a parent node feature are perceptible as a group of related node features.

Presentation of representations as in FIG. 3 produces a perception that the nearest node spacings of some node features increase and the nearest node spacings of others decrease.

As indicated by the dashed line in FIG. 3, the act in box 124 is included in one iteration, and additional iterations can be performed to present different representations of the node-link structure ending with a last representation. In each iteration, the spacings change, resulting in a series of representations, each perceptible as a changed continuation of the first representation.

Machine 150 in FIG. 4 includes processor 152 connected for receiving data indicating user signals from user input circuitry 154 and for providing data defining images to display 156. Processor 152 is also connected for accessing node-link data 158, which define a node-link structure. Processor 152 is also connected for receiving instruction data 160 indicating instructions through instruction input circuitry 162, which can illustratively provide instructions received from connections to memory 164, storage medium access device 166, or network 168.

In executing the instructions indicated by instruction data 160, processor 152 uses node-link data 158 to provide first representation data to display 156 to cause it to present a first representation of the node-link structure.

The first representation includes a region with more spaced node features and peripheral branches in which children are perceptible as a group of related node features, as discussed above in relation to FIG. 1.

In executing the instructions indicated by instruction data 160, processor 152 also receives user signal data from user input device 154 indicating a change in the first representation.

In response, processor 152 automatically provides second representation data to display 156 to cause it to present a sequence of at least one following representation, ending with a last representation that is perceptible as a changed continuation of the first representation. Like the first representation, the last representation includes a region with more spaced node features and peripheral branches in which children are perceptible as a group of related node features, as discussed above in relation to FIG. 1. But the region of greater spacings in the last representation includes a different subset of node features than in the first representation, and presentation of the last representation produces a perception that some nearest node spacings increase and others decrease.

As noted above, FIG. 4 illustrates three possible sources from which instruction input circuitry 162 could receive data indicating instructions-memory 164, storage medium access device 166, and network 168.

Memory 164 could be any conventional memory within machine 150, including random access memory (RAM) or read-only memory (ROM), or could be a peripheral or remote memory device of any kind.

Storage medium access device 166 could be a drive or other appropriate device or circuitry for accessing storage medium 170, which could, for example, be a magnetic medium such as a set of one or more tapes, diskettes, or floppy disks; an optical medium such as a set of one or more CD-ROMs; or any other appropriate medium for storing data. Storage medium 170 could be a part of machine 150, a part of a server or other peripheral or remote memory device, or a software product. In each of these cases, storage medium 170 is an article of manufacture that can be used in machine 150. Data units can be positioned on storage medium 170 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 180. Processor 182 in machine 180 can establish a connection with processor 152 over network 168 through network connection circuitry 184 and instruction input circuitry 162. Either processor could initiate the connection, and the connection could be established by any appropriate protocol. Then processor 182 can access instruction data stored in memory 186 and transfer the instruction data over network 168 to processor 152 so that processor 152 can receive instruction data 160 from network 168. Instruction data 160 can then be stored in memory 164 or elsewhere by processor 152, and can be executed.

C. Implementation

The general features described above could be implemented in numerous ways on various machines to present representations of node-link structures. An implementation described below has been implemented on a Sun SPARC-Station running a Unix/X operating system. Another implementation has been done on an Apple Macintosh personal computer. The Unix implementation executes instructions written in a Common Lisp programming environment extended with Common Lisp Interface Manager (CLIM). Commercial Common Lisp environments and CLIM extensions are available from Lucid Inc. and Franz Inc.

C.1. System

Figure 5:
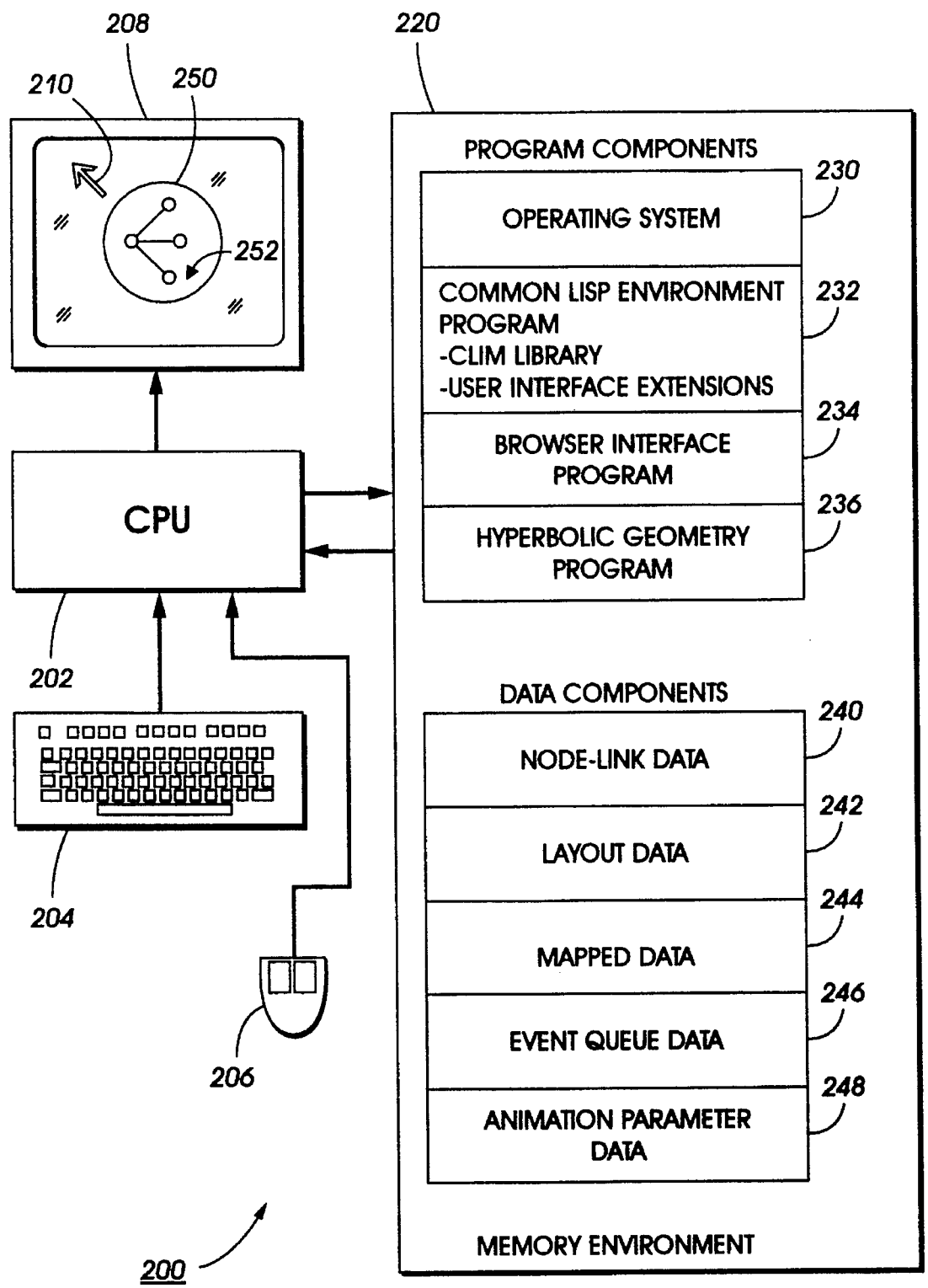
FIG. 5 is a schematic block diagram showing components of a system that can present a sequence of representations of a node-link structure, each with a region of greater spacings and peripheral branches, but with the last perceptible as a changed continuation of the first.

FIG. 5 illustrates components of systems in which the invention has been implemented.

Machine 200 in FIG. 5 includes central processing unit (CPU) 202, a microprocessor or other appropriate processor. CPU 202 is connected to receive data indicating user signals from user input devices that illustratively include keyboard 204 and mouse 206. CPU 202 is also connected to provide data to cause presentation of images on display 208.

Images presented on display 208 can include pointer 210 controlled by mouse 206 or another pointer control device.

CPU 202 is connected to one or more memory components that together provide memory environment 220. The memory components conventionally include resident RAM connected directly to CPU 202, one or more internal disk drives or other storage medium access devices connected to CPU 202 through an internal bus, and one or more external memory components such as peripheral devices or remote servers that include storage medium access devices and that are connected to CPU 202 through external connections of machine 200. CPU 202 conventionally accesses data stored in any memory component in environment 220 by providing addresses.

FIG. 5 illustratively shows program components and data components stored in memory environment 220; program and data components are illustratively shown separately, but need not be stored separately within a given memory component. Program components include data that indicate instructions CPU 202 can execute, and can be stored in object code form or source code form; if appropriate, the program components can also include any compilers and interpreters needed to obtain instructions from program components stored in source code form. In executing instructions indicated by program components, CPU 202 accesses and uses data components.

In executing instructions indicated by operating system program 230, CPU 202 performs operations that transfer data between CPU 202 and other components of machine 200. Such operations can include, for example, mapping logical addresses in the memory space of CPU 202 to physical addresses for accessing a memory component in environment 220.

In executing instructions indicated by Common Lisp environment program 232, which includes a CLIM library and user interface extensions, CPU 202 provides the standard CLIM interface defined in the CLIM 2.0 specification available from Franz Inc. As a result, CPU 202 can execute CLIM programs, so that browser interface program 234 and hyperbolic geometry program 236 can be implemented in Common Lisp extended with CLIM.

In executing instructions indicated by browser interface program 234, CPU 202 first initializes machine 200. Then CPU 202 uses node-link data 240 defining a node-link structure to obtain layout data 242, indicating positions for parts of the node-link structure in a layout space; in the current implementation, the layout space is a hyperbolic plane. Then CPU 202 uses layout data 242 to obtain mapped data 244 for an initial representation of the node-link structure. CPU 202 provides data to display 208 to cause presentation of the initial representation.

In executing instructions indicated by browser interface program 234, CPU 202 also receives data indicating user signal events from keyboard 204 and mouse 206. CPU 202 sets up, maintains, and handles a queue of steps for responding to an event by accessing event queue data 246. When the steps responding to a user signal event are completed, CPU 202 can set up steps for responding to the next event.

In executing instructions indicated by browser interface program 234, CPU 202 can also modify animation parameters by accessing animation parameter data 248. Or CPU 202 can use layout data 242 to obtain mapped data 244 for a changed representation of the node-link structure, then provide data to display 208 to cause its presentation.

CPU 202 can execute instructions indicated by hyperbolic geometry program 238 for various purposes, such as to obtain layout data 242, to obtain mapping data 244, and to map from a position of pointer 210 to a part of the node-link structure. As shown in FIG. 5, a representation can include a background 250 on which a FIG. 252 is shown, and a position of pointer 210 within FIG. 252 can be mapped to the nearest node, for example.

C.2. User Interface Overview

Figure 6:
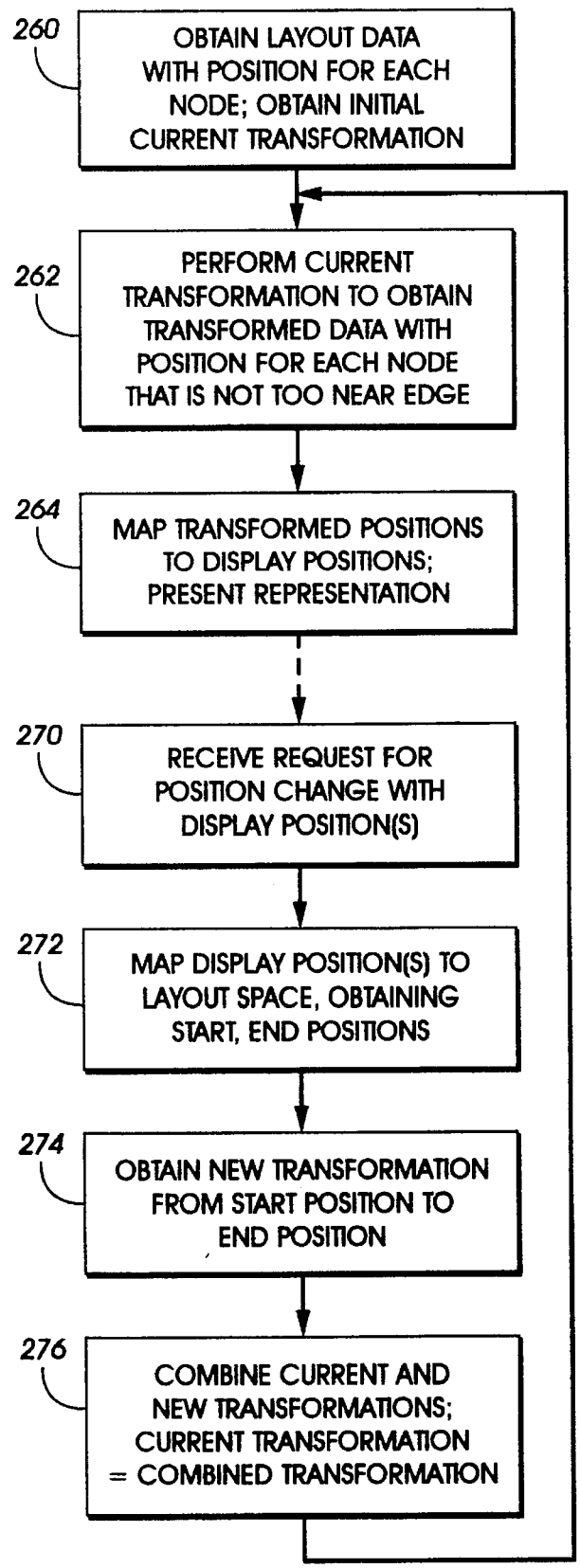
FIG. 6 is a flow chart showing acts by which the machine in FIG. 5 can provide a browser interface by transforming and mapping positions for a subset of nodes not too near an edge in response to requests for position changes.
Figure 7:
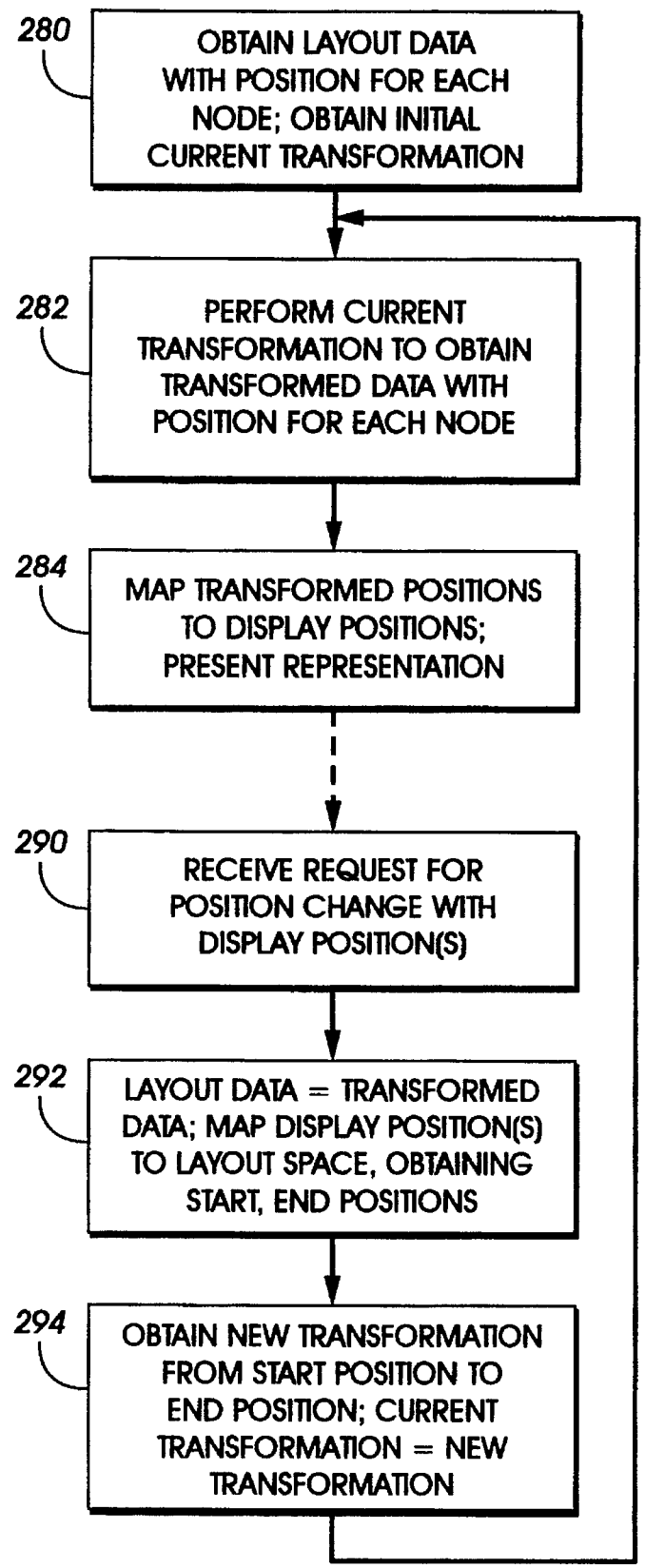
FIG. 7 is a flow chart showing acts by which the machine in FIG. 5 can provide a browser interface by successively transforming and mapping positions for all nodes in response to requests for position changes.

The operations of CPU 202 described above can be implemented to provide a user interface in many ways. FIG. 6 shows how the machine in FIG. 5 can provide an interactive user interface by transforming positions for a subset of nodes not too near an edge. FIG. 7 shows how the machine in FIG. 5 can provide an interactive user interface by successively transforming layout data for all nodes.

The general approach in FIGS. 6 and 7 is that positions of nodes can be transformed in layout space; then, a representation can be presented by mapping from the layout space to display positions. As mentioned above, the layout space can be a hyperbolic plane or another appropriate space with negative curvature. The display positions can be positions within a circular display region, to facilitate mapping between the hyperbolic plane and the display region.

The act in box 260 in FIG. 6 obtains layout data indicating a position in a layout space for each node in a node-link structure. The layout space can, for example, be a hyperbolic plane. The act in box 260 also initializes a current transformation that can be performed on the layout data to obtain transformed positions. The initial current transformation could, for example, be a null transformation that does not change the positions of the nodes in the layout space.

The act in box 262 then performs the current transformation on the layout data from box 260 to obtain transformed data indicating transformed positions for each node except those nodes with positions in the layout space that are too near an edge. The edge bounds the part of the layout space that is presented when a representation of the node-link structure is displayed.

The act in box 264 then maps the transformed positions from box 262 to obtain a position on a display for each node that is not too near the edge. The act in box 264 then presents a representation on the display. The representation includes, for each node that is not too near the edge, a node feature at the node's display position.

As indicated by the dashed line in FIG. 6, the act in box 264 can be followed after an unspecified time by the act in box 270, which receives a request from a user for a position change. The request includes an indication of at least one position on the display.

The act in box 272 maps the display position(s) indicated in box 270 back to the layout space to obtain start and end positions in layout space. For example, if only one display position is indicated, as by a mouse click, the position of the pointer when the click occurs can be used to obtain the start position and the end position can be the position in layout space of the center of the representation. Or, if two display positions are indicated, as during a dragging motion from a button press to a button release, the position of the pointer when the button press occurs can be used to obtain the start position and the position when the button release occurs can be used to obtain the end position.

The act in box 274 obtains a transformation of the layout space that moves the start position to the end position. If the layout space is a hyperbolic plane, the act in box 274 can be implemented as described in detail in copending coassigned U.S. patent application Ser. No. 08/XXX,XXX (Attorney Docket No. D/94473Q), entitled "Layout of Node-Link Structures in Space with Negative Curvature" ("the Layout Application"), incorporated herein by reference.

The act in box 276 combines the current transformation with the new transformation from box 274 to obtain a combined transformation. The combined transformation becomes the current transformation when the acts in boxes 262 and 264 are performed to present another representation.

As described below, the technique in FIG. 6 has been implemented to present a sequence of representations in response to a click rather than just one representation. This modification can provide a perception of continuous motion from the start position to the end position.

The technique in FIG. 7 is similar to FIG. 6, with the act in box 280, for example, being the same as the act in box 260. A key difference, however, is that the act in box 282 obtains a transformed position for each node in the node-link structure, including those that are treated as too near the edge in box 262. As a result, the technique of FIG. 7 is not as efficient as the technique of FIG. 6 for large node-link structures.

The act in box 284 maps the transformed positions from box 282 to display positions, as in box 264 in FIG. 6, and uses the display positions to present a representation as in box 264.

The act in box 290 receives a request as in box 270. The act in box 292 responds by first updating the layout data to be the transformed data from box 282 rather than the layout data from box 280. Then the act in box 292 maps from the display position(s) indicated in box 290 to the transformed layout space to obtain start and end positions. The act in box 294 obtains a new transformation that moves the start position to the end position, and updates the current transformation to be the new transformation before the acts in boxes 282 and 284 are performed to present another representation.

As noted above, the technique of FIG. 6 can handle large node-link structures better than the technique of FIG. 7 because the act in box 262 is not performed for nodes that are too near the edge. The technique of FIG. 7 has been found to be impractical for large structures. In addition, because some information is lost in obtaining a transformation, the technique of FIG. 6 is more precise, because it continues to use the original layout data from box 260.

C.3. Operations

The following implementation of CPU 202 operations follows the user interface technique of FIG. 6.

C.3.a. Animation

Figure 8:
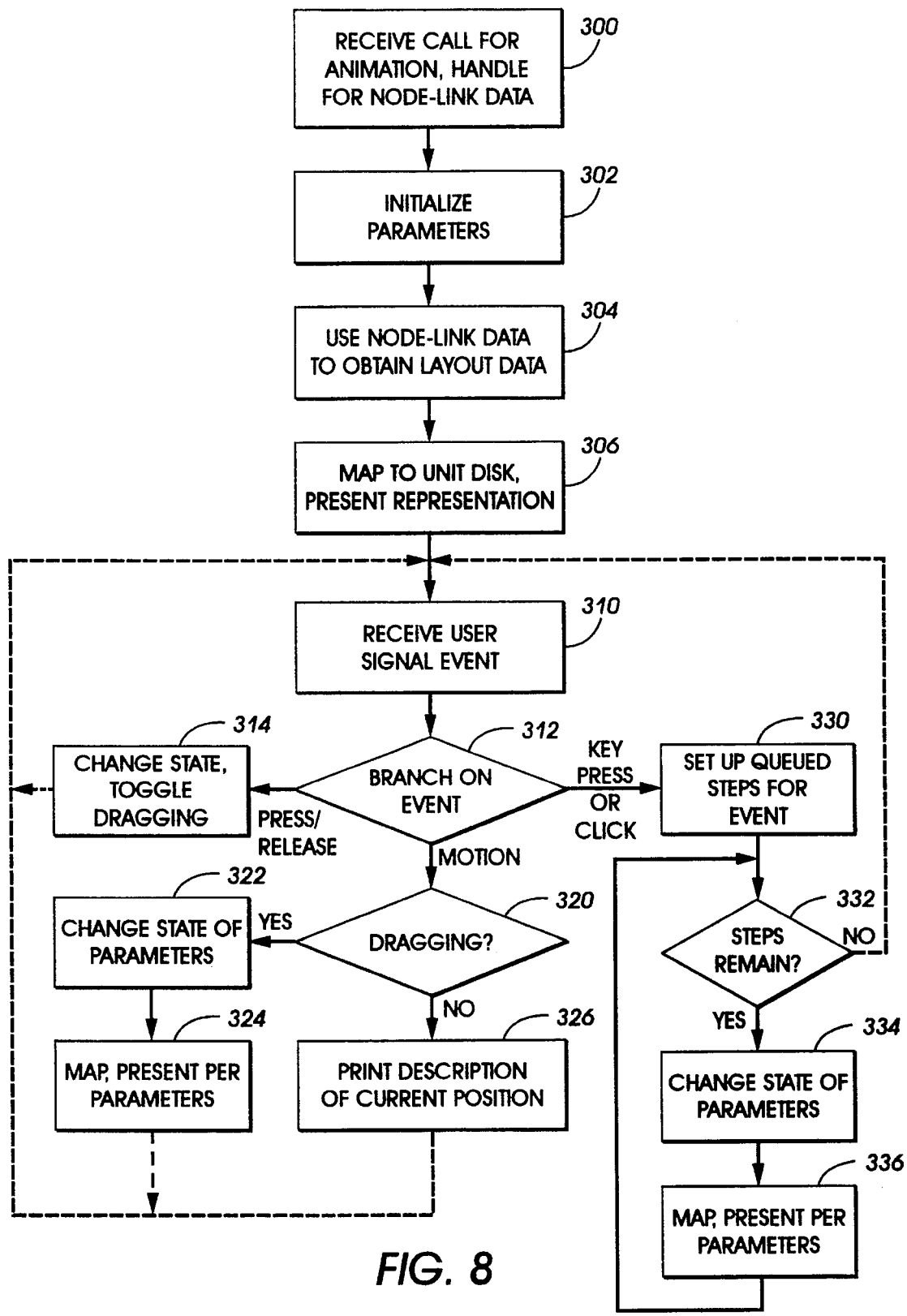
FIG. 8 is a flow chart showing acts in an animation operation by the system of FIG. 5 implementing the technique of FIG. 6.

FIG. 8 shows acts in animation operations of CPU 202. CPU 202 performs the acts in FIG. 8 in executing instructions indicated by browser interface program 234.

The act in box 300 receives a call for animation operations. The call includes a handle for node-link data 250.

The act in box 302 begins by accessing animation parameter data 258 and initializing parameters that are used in performing animation. Examples of parameters are discussed below.

The act in box 304 uses node-link data 250 to obtain layout data 252. The act in box 306 then uses layout data 252 to map to a unit disk and to map the unit disk to a circular region of display 208. The act in box 306 also provides data causing presentation of an initial representation on display 208, based on the mapping.

As indicated by the dashed line between boxes 306 and 310, CPU 202 may wait an unspecified period of time before the act in box 310 receives data from keyboard 204 or mouse 206 indicating the occurrence of a user signal event. CPU 202 could, for example, periodically test whether such an event has occurred.

When an event occurs, the act in box 312 branches based on the type of event received in box 310.

If the event is a press or release of a button on mouse 206, indicating the beginning or end of a dragging action with mouse 206, the act in box 314 changes state by updating parameters such as pointer position and by toggling a dragging variable that indicates whether a dragging action is occurring. Then another user signal event can be received in box 310, as indicated by the dashed line from box 314 to box 310.

If the event is a motion event, indicating an action moving mouse 206, the act in box 320 branches based on whether the dragging variable indicates a dragging action is occurring. When dragging is occurring, the act in box 322 changes state by updating parameters in preparation for a mapping operation. The act in box 324 then uses the updated parameters from box 322 to map from the positions indicated by the layout data from box 304 to positions on the unit disk. The act in box 324 then presents the resulting representation on display 208, as in box 306.

The act in box 326, which is performed only if dragging is not occurring, updates pointer position and prints a description of the current position below the displayed representation of the node link structure, providing information to assist the user in navigating to a desired node. The description can include, for example, a number and a name identifying a node whose node feature is nearest the pointer's position. The nearest node can be found by first mapping from a display position to a position in the layout space, and by then searching nodes for the nearest node. For efficiency, the search can be limited to branches that could include the nearest node.

After the acts in boxes 324 and 326, another user signal event can be received in box 310, as indicated by the dashed lines from boxes 324 and 326 to box 310.

If the event is a key press from keyboard 204 or a click from mouse 206, i.e. a press followed immediately by a release of the mouse button, the act in box 330 sets up one or more steps on a queue to respond to the event. A key press indicates a change in a parameter, while a click indicates a change of the part of the node-link structure represented in the region of greater spacings. The act in box 332 then begins an iterative loop that continues until the queue is empty. Each iteration includes an act in box 334 that changes state by updating parameters, as in box 324. Each iteration also includes an act that uses the updated parameters from box 334 to map from the positions indicated by the layout data from box 304 to positions on the unit disk. The act in box 336 then presents the resulting representation on display 208, as in box 326.

When the queue is empty, the act in box 310 can receive another user event signal, as indicated by the dashed line from box 332 to box 310. Alternatively, the act in box 320 could test whether a new user signal event has occurred; if so, the queue could be cleared and the act in box 310 could then be performed to receive the new user signal event.

In the current implementations, user signal events fall into two general types: One type of event requests presentation of a changed representation, and therefore can be handled with layout and mapping operations. The other type modifies an animation parameter and can be handled by parameter setting operations.

C.3.b. Layout

Figure 9:
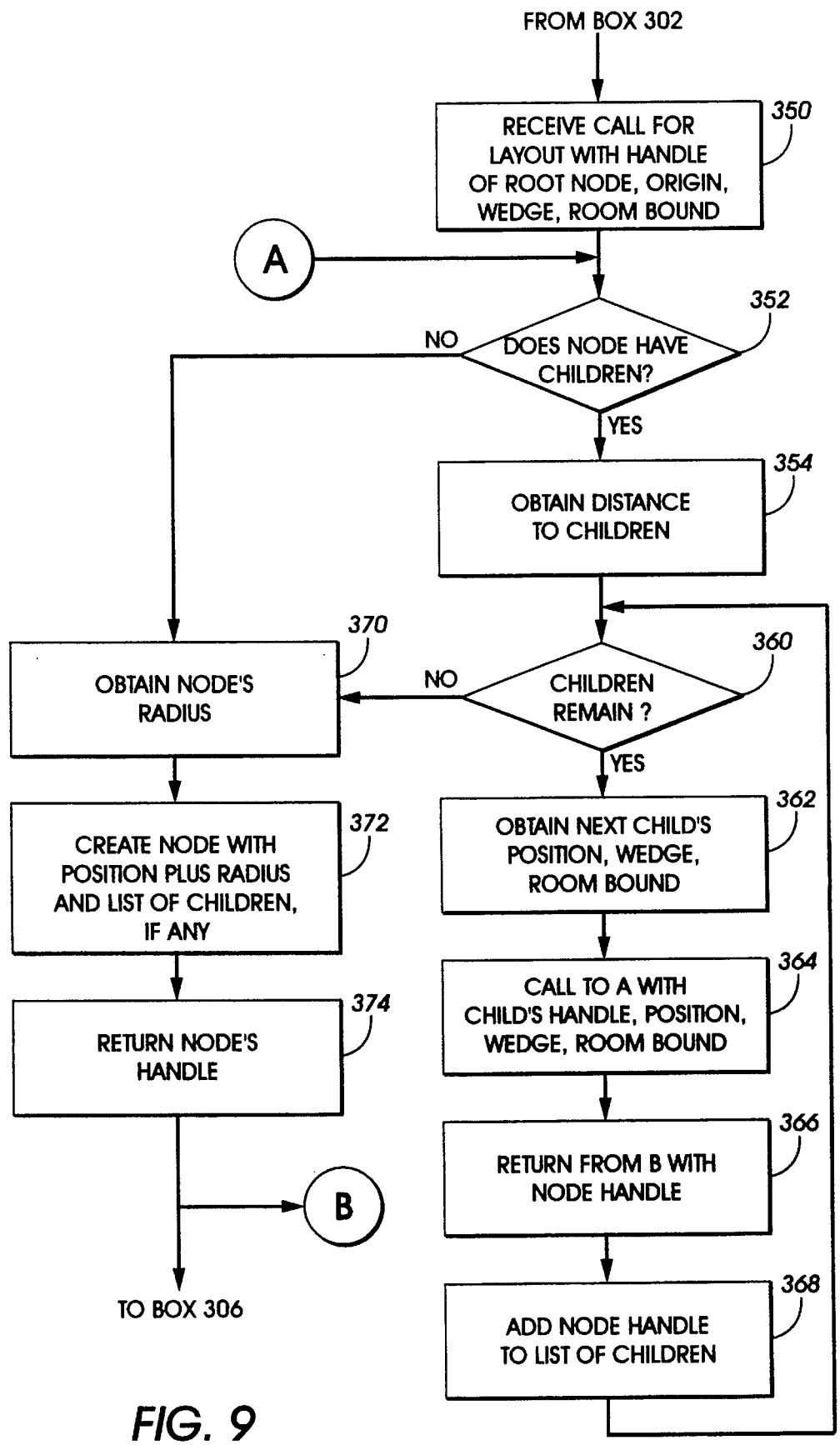
FIG. 9 is a flow chart showing acts in a layout operation in FIG. 8.

FIG. 9 shows acts in using node-link data to obtain layout data, as in box 304 in FIG. 8.

The act in box 350 in FIG. 9 begins by receiving a call to perform a layout operation with the handle of a root node in the node-link data, with coordinates of a position in a hyperbolic plane, with a wedge of the hyperbolic plane that is available for the descendants of the root node, and with a room bound. The wedge has the position as its vertex. The room bound defines a circle with the position at its center.

The technique of FIG. 9 lays out space for the node and its children within the regions of the circle and the wedge. The layout operation of FIG. 9 can be used with node-link data defining an acyclic hierarchical node-link structure such that the handle of the node-link data is also the root node's handle. The wedge of the hyperbolic plane can be defined by a wedge angle and a direction. If the children of the root node can radiate in all directions, the wedge angle can be 360° and the direction does not matter, but for a canonical orientation such as rightward, the wedge angle is smaller, such as 120°, and the direction determines the orientation. The room bound can be initialized to 0.9 for the root node.

The act in box 352 tests whether the node currently being handled has children. If so, the act in box 354 obtains a distance to the children in the hyperbolic plane, using techniques described in detail in the Layout Application. Then the act in box 360 begins an iterative loop that handles each of the current node's children in turn.

The act in box 362 begins each iteration by obtaining, for the next child node, a position in the hyperbolic plane, a wedge, and a room bound. The act in box 362 uses the distance from box 354 and also uses techniques described in detail in the Layout Application. The room bound can be one-half the distance from the child's parent from box 354 or the radius of a circle in the wedge, whichever is smaller. The circle is tangent to the sides of the wedge and has its center at the child's position obtained in box 362. The act in box 364 then makes a recursive call for a layout operation with the handle of the next child and with its position, wedge, and room bound from box 362. The act in box 366 returns from the recursive call and the act in box 368 then adds the child's handle to a list of children for the current node.

When all of the current node's children have been handled, the act in box 370 obtains a radius for the current node, by taking either the room bound received in the call in box 350 or box 364 or one-half the distance to the current node's children from box 354, whichever is smaller. If the current node has no children, the act in box 370 takes the room bound from box 350 as the radius.

The act in box 372 then creates a data structure for the current node. The current node's data structure includes its position and its radius from box 370, and, if the current node has children, its node data structure also includes a handle or other link to the list of its children from box 368. The data structure can also include other relevant information. Then, the act in box 374 ends by returning the handle of the current node's data structure.

C.3.c. Dragging

Figure 10:
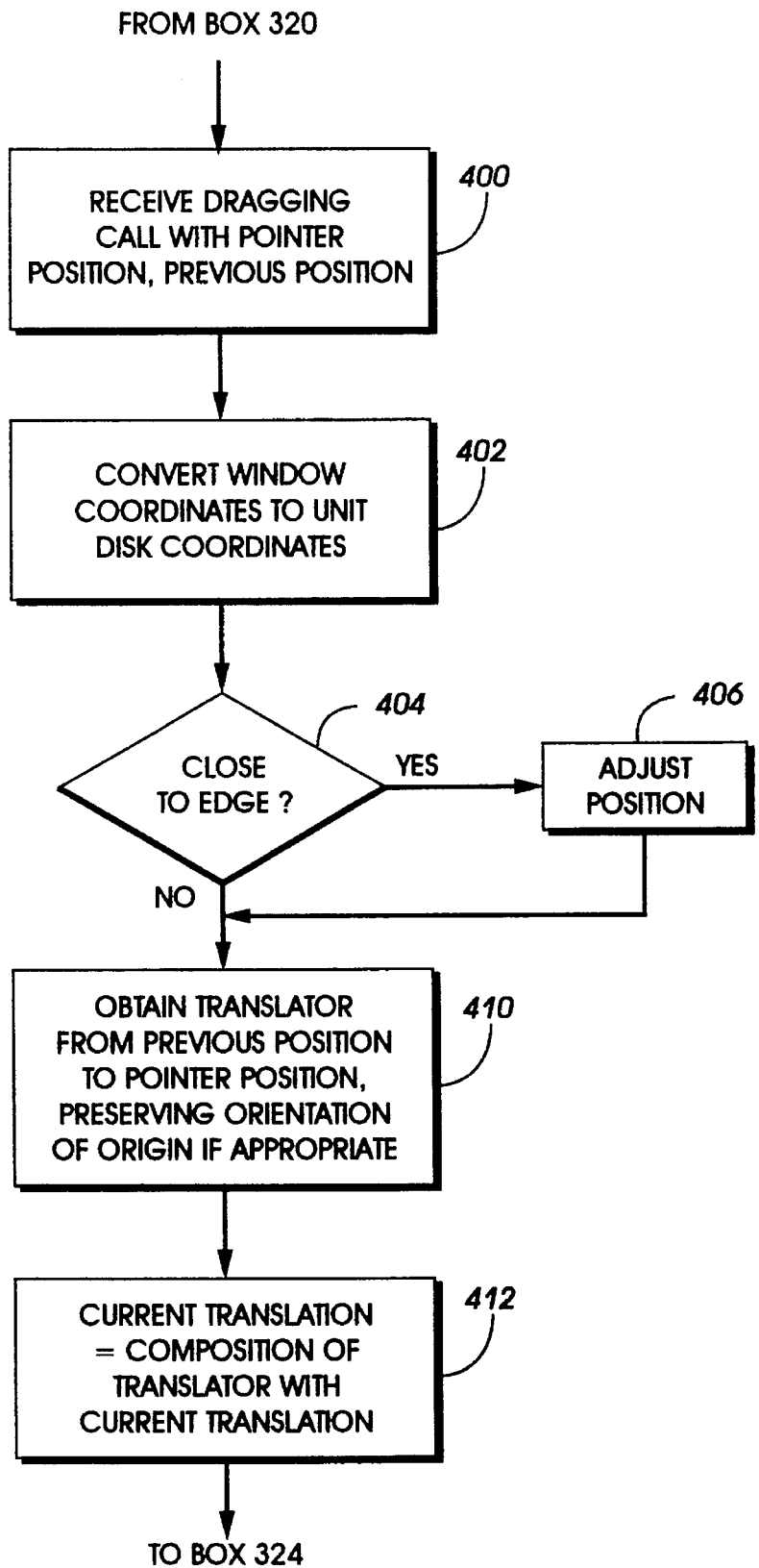
FIG. 10 is a flow chart showing acts in responding to dragging in FIG. 8.

FIG. 10 shows acts in dragging, as in box 322 in FIG. 8.

The act in box 400 in FIG. 10 receives a call for dragging with a pointer position and with a previous position of the pointer. The act in box 402 then begins by converting the pointer position and the previous position from box 400 from coordinates in a window on display 208 to coordinates to which hyperbolic geometry operations can be applied. In the illustrated implementation, display coordinates are converted to coordinates on a unit disk, meaning a disk of radius 1.0 representing the Poincaré model of the hyperbolic plane. Each position on the unit disk can be specified by a pair of x- and y-coordinates between −1.0 and +1.0. Therefore, the conversions in box 402 can be done by dividing each coordinate in the window by the radius of the window, or by half the length of a side if the window is square, and then subtracting one.

Since motions very near the edge become highly magnified, the act in box 404 then tests whether either of the unit disk pointer position and the unit disk previous position from box 402 is too close to the edge of the unit disk, e.g. within approximately 0.025 of the edge. If so, the act in box 406 adjusts the position that is too close to the edge, such as by multiplying each coordinate by the ratio of 0.97 to the distance from the origin to the position, thus slightly reducing each coordinate to move the position further from the edge.

The conversion in box 402 and, if necessary, the adjustment in box 406 produce an inverse image of the previous position and an inverse image of the pointer position, both in the layout space.

The act in box 410 then obtains a translator, by finding a transformation in the layout space that will take the inverse image of the previous position to the inverse image of the pointer position. The translator can be obtained using techniques described in detail in the Layout Application, using hyperbolic geometry and preserving orientation of the part of the node-link structure at the origin of the layout, which may be the root node of the node-link structure.

The act in box 412 then composes the translator from box 410 with a current translation that obtained the previous representation, obtaining a new current translation. The composition can be obtained using techniques described in detail in the Layout Application. This new current translation is then used in box 324 in FIG. 8 to map and present a new representation as described in greater detail below.

C.3.d. Key Press Steps

Figure 11:
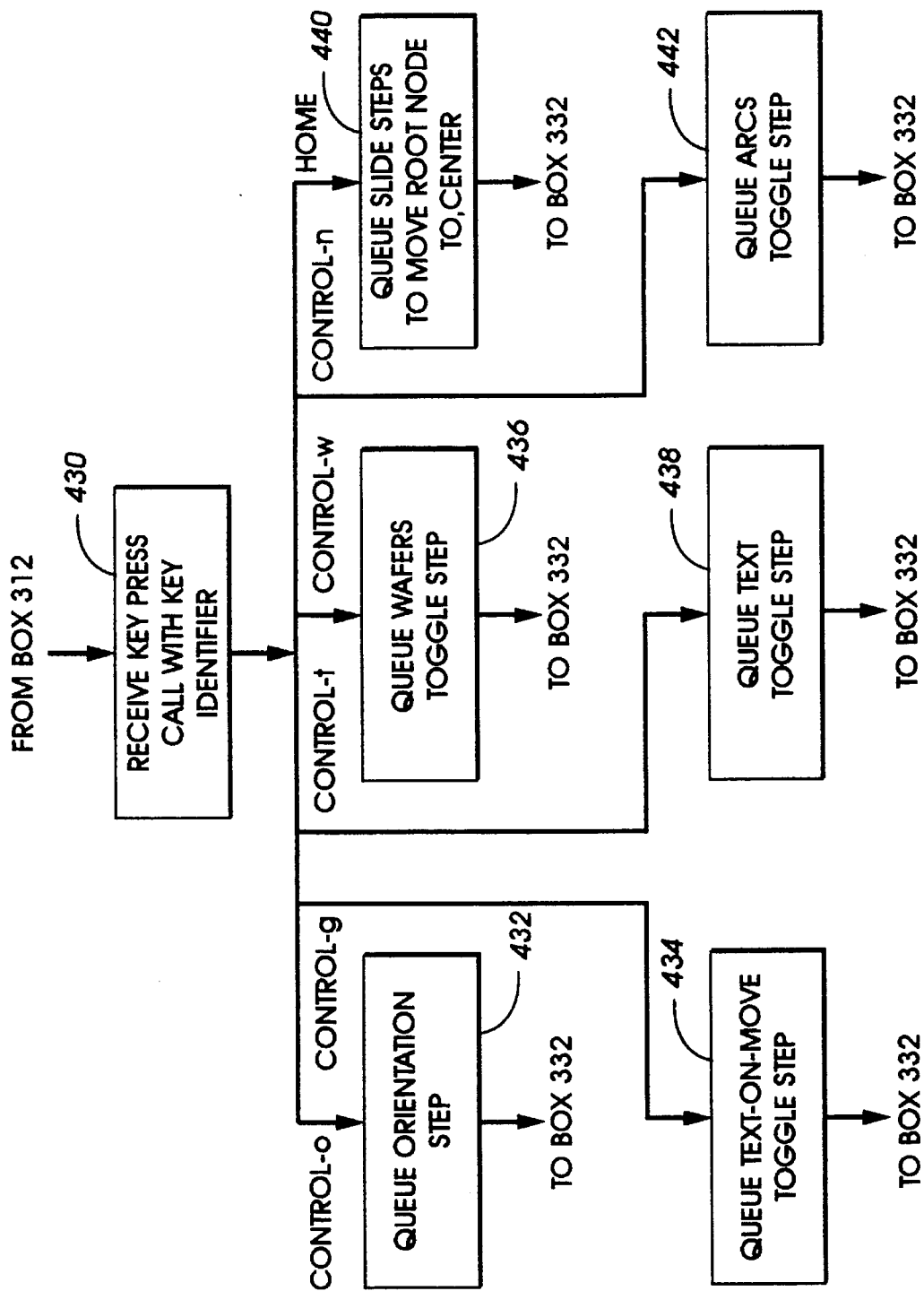
FIG. 11 is a flow chart showing acts in responding to a key press in FIG. 8.

FIG. 11 shows acts in queuing steps in response to a key press, as in box 330 in FIG. 8.

The act in box 430 in FIG. 11 receives a key press call with an identifier of the key or keys pressed. The technique in FIG. 11 then branches based on the key or keys pressed, as indicated for the current implementation.

If the control key and the "o" key are pressed, the act in box 432 loads an orientation step onto the queue. When handled in box 334, the orientation step can change the manner in which orientation of child nodes in relation to their parent changes in response to a click call. In addition to a root-preserving orientation that preserves the original orientation of the children of the root node, a rightward orientation has been implemented in which child nodes of a node near the center of a region of greater spacings are rightward from their parent.

The orientation step can toggle between the root-preserving orientation and the rightward orientation. Then the orientation step can call for a layout operation as described above in relation to FIG. 9 so that nodes are laid out appropriately for the new orientation. If the new orientation is a root-preserving orientation, subsequent click operations can obtain transformations that preserve original orientation at the root node feature; if rightward orientation, subsequent click operations can obtain transformations that orient a node's child nodes to the right if the node is transformed to a position near the center of the region of greater spacings. The motivation and techniques for preserving orientation are discussed below in relation to FIGS. 20 and 21.

If the control key and the "g" key are pressed, the act in box 434 loads a step onto the queue that, when handled in box 334, toggles a text-on-move variable from on to off or vice versa. Subsequent operations use the value of text-on-move to determine whether to display text in intermediate representations in a sequence of representations presented in response to a click, as discussed below in relation to FIG. 20.

If the control key and the "t" key are pressed, the act in box 436 loads a step onto the queue that, when handled in box 334, toggles a text variable from on to off or vice versa. Subsequent operations use the value of text to determine whether to display node features that include rectangles and text.

If the control key and the "w" key are pressed, the act in box 438 loads a step onto the queue that, when handled in box 334, toggles a wafers variable from on to off or vice versa. Subsequent operations use the value of wafers to determine whether to display node features that include circles instead of rectangles when the text variable is also on.

If the control key and the "a" key are pressed, the act in box 440 loads a step onto the queue that, when handled in box 334, toggles an arcs variable from on to off or vice versa. Subsequent operations use the value of arcs to determine whether to display link features as straight lines or arcs in intermediate representations in a sequence of representations presented in response to a click, as discussed below in relation to FIG. 20.

If the home key is pressed, the act in box 442 loads a series of slide steps onto the queue that, when handled by a series of iterations of boxes 334 and 336, move the root node of the node-link structure from its current position to the center of the displayed representation. The slide steps can be loaded similarly to the operations described below in relation to a click call. Pressing the home key is equivalent to a click on the root node feature, but without the problem of finding the root node feature.

C.3.e. Click Steps

Figure 12:
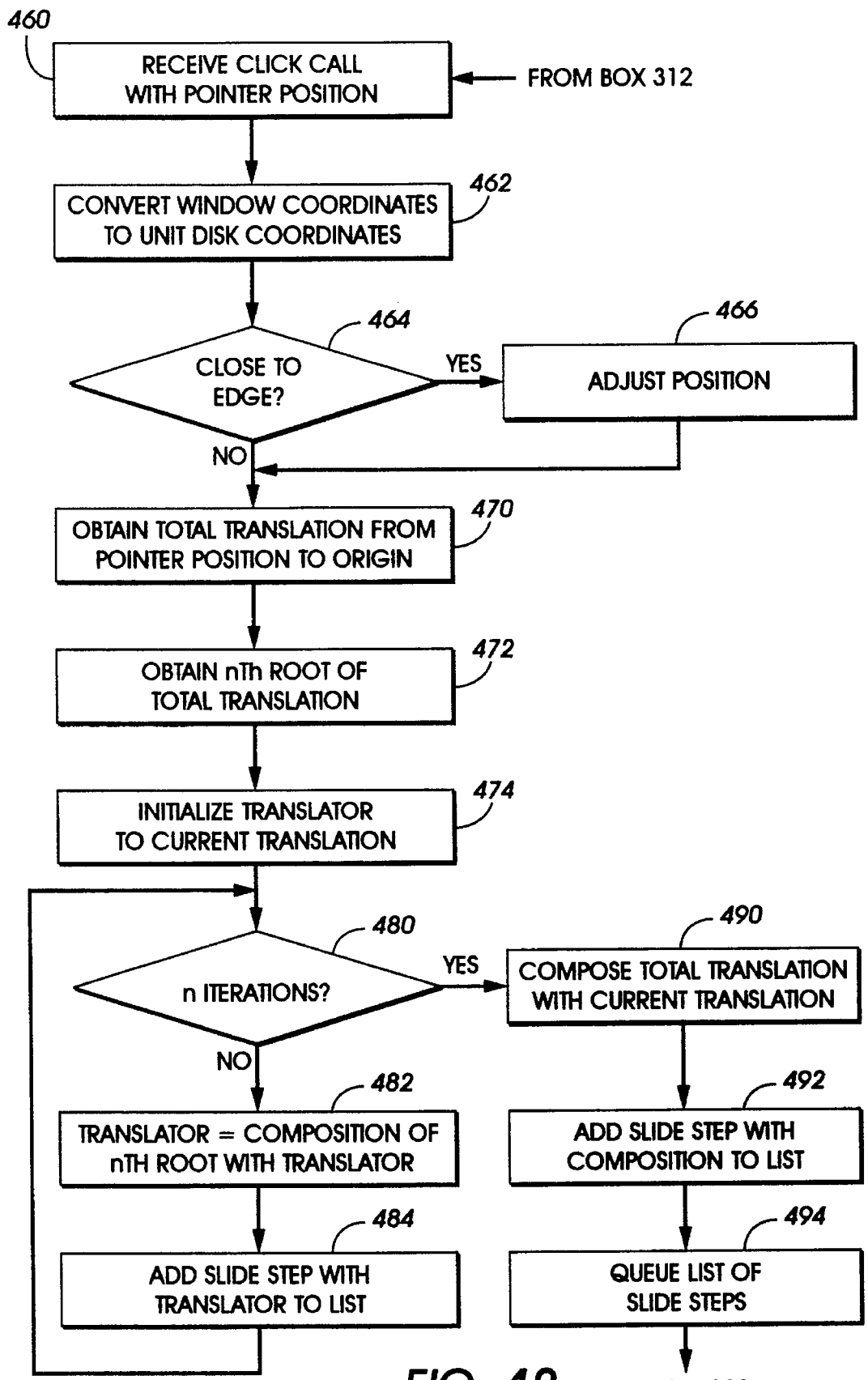
FIG. 12 is a flow chart showing acts in responding to a click in FIG. 8.

FIG. 12 shows acts in queuing steps in response to a click, as in box 330 and 334 in FIG. 8.

The act in box 460 in FIG. 12 receives a click call with a pointer position. As in box 402 in FIG. 10, the act in box 462 converts the window coordinates from box 460 to unit disk coordinates. As in boxes 404 and 406 in FIG. 10, the acts in boxes 464 and 466 adjust the unit disk coordinates if the pointer position is too close to the edge of the unit disk. As in box 10, the acts in boxes 462 and 466 produce an inverse image of the pointer position.

The act in box 470 obtains a total translation, by finding a transformation in the layout space that will take the inverse image of the pointer position to the inverse image of the center of the display region in which representations are presented. The act in box 472 then obtains the nth root of the total translation from box 470. The acts in boxes 470 and 472 can be implemented using techniques described in the Layout Application, using hyperbolic geometry and preserving orientation of the part of the node-link structure at the origin of the layout, which may be the root node of the node-link structure.

The act in box 474 then prepares for an iterative loop by setting a variable Translator to a current translation that obtained the currently presented representation. Then the act in box 480 begins the iterative loop, which continues for n iterations.

In each iteration, the act in box 482 composes the nth root from box 472 with Translator, either from box 474 or from the previous iteration, to obtain a new value for Translator. The act in box 484 then adds a slide step with the Translator obtained in box 482 to a list of slide steps.

When n iterations have been performed, the act in box 490 composes the total translation from box 470 with the current translation and the act in box 492 adds a final slide step with the composition obtained in box 492 to the list of slide steps. Then the act in box 494 adds the list of slide steps to the queue.

C.3.f. Presenting a Representation

Figure 13:
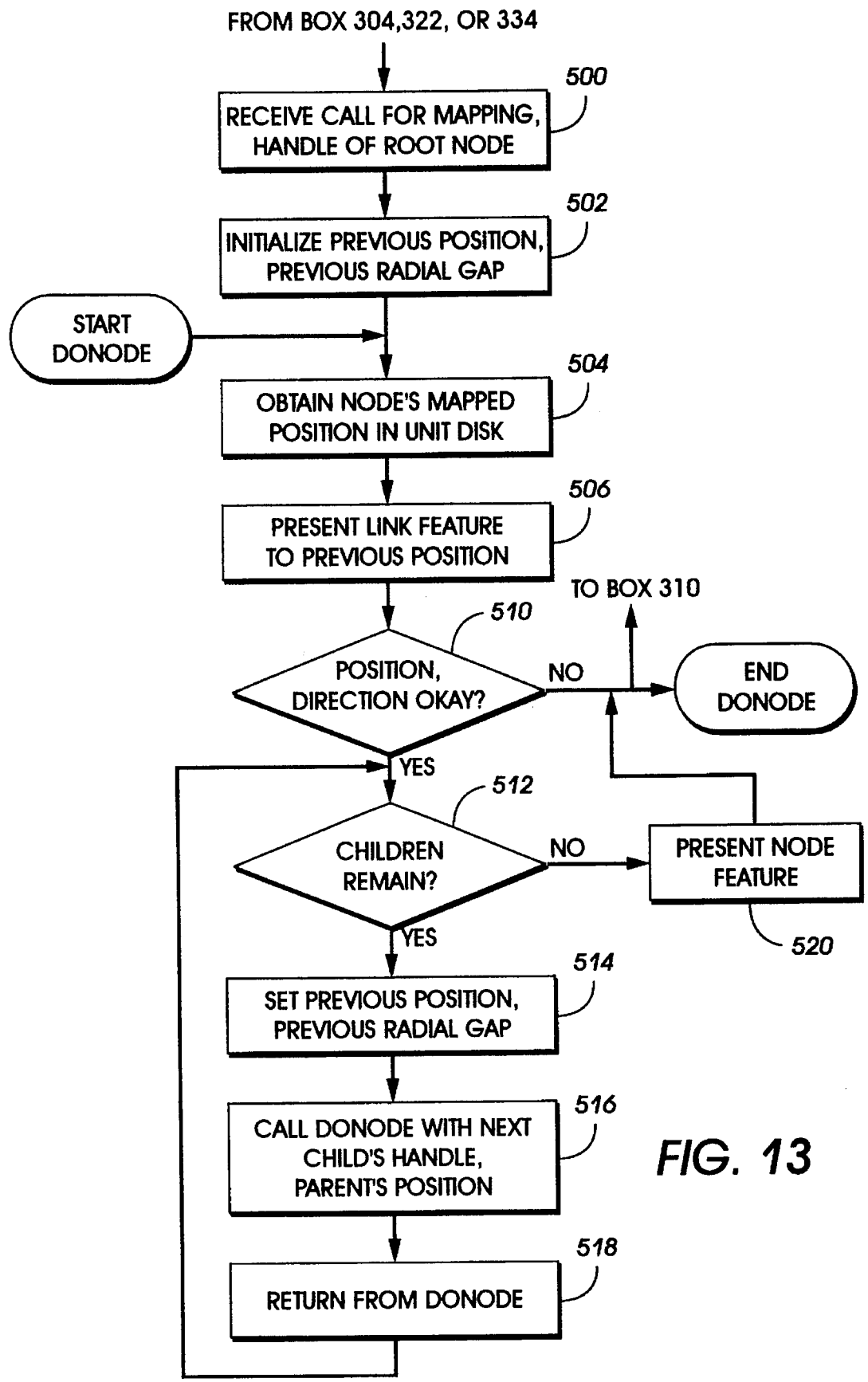
FIG. 13 is a flow chart showing acts in mapping from layout to display in FIG. 8.

FIG. 13 shows acts in using layout data from box 304 in FIG. 8 to present a representation of a node-link structure, as in boxes 306, 326, and 336 in FIG. 8.

In FIG. 13, the act in box 500 receives a call for mapping with the handle of the root node of a node-link structure, similarly to the act in box 350 in FIG. 9. The act in box 502 begins mapping by initializing variables, including a variable to indicate a previous node feature's position and a variable to indicate the previous position's radial gap from a unit disk's perimeter.

The act in box 504 begins a recursive operation, referred to in FIG. 13 as DoNode, by obtaining the current node's mapped position in the unit disk, using techniques described in detail in the Layout Application. The mapped position is the current node's inverse image in the layout space. The act in box 506 then uses the current transformation to present a link feature which has been implemented as a line, either an arc or a straight line, connecting the position from box 504 to the previous node feature's position.

The act in box 510 determines whether the position from box 504 is such that a node feature can be presented. This has been implemented by calculating a radial gap for the position from box 504, then comparing it with a limit to determine whether it is a position too close to the unit disk's perimeter. The limit used in box 510 can depend on whether an intermediate iteration is being performed, in which case the limit can be larger to reduce the time necessary to render a presentation. If it is too close, the act in box 510 also compares the radial gap with 95 percent of the previous position's radial gap to determine whether the current position is in a direction from its parent such that its children may be further from the unit disk's perimeter than the current position is. If the act in box 510 finds that the position and direction are both not okay, DoNode ends. But if the current position is not too close or if its children may be further from the perimeter than it is, a node feature representing the current node may be presented, so the act in box 512 begins an iterative loop that handles each of its children.

In preparation for a recursive call to DoNode, the act in box 514 begins each iteration by setting the previous node feature's position to the position from box 504 and by setting the previous position's radial gap to the radial gap calculated in box 510. These values are set locally within the iteration. Then, the act in box 516 makes a call to DoNode for the next child with the child's handle and with the parent's position from box 504. The act in box 518 returns from DoNode.

When all the children have been handled, so that each has a mapped position in the unit disk, the act in box 520 presents the current node's node feature, which has been implemented as a rectangle with text if space permits. Therefore, the node feature is painted over the link features presented in box 506. The node feature can be positioned by using the radius and mapped position of the node in the layout space to obtain a mapped region in the display plane, with the mapped region defined by a center and a radius as described in detail in the Layout Application. If the wafers variable is on, the node feature includes a circle with the radius and text centered at the center, but if the text variable is on, the node feature includes a rectangle and text centered at the center.

The acts in boxes 506 and 520 each include presenting a feature on display 208. These acts can be implemented as appropriate for the specific display system being used, using conventional display driver techniques. In general, these acts make a constant transform from unit disk positions to display positions.

The technique in FIG. 13 can also include switching animation buffers after each representation is presented, such as after the act in box 520.

C.4. Examples

Figure 14:
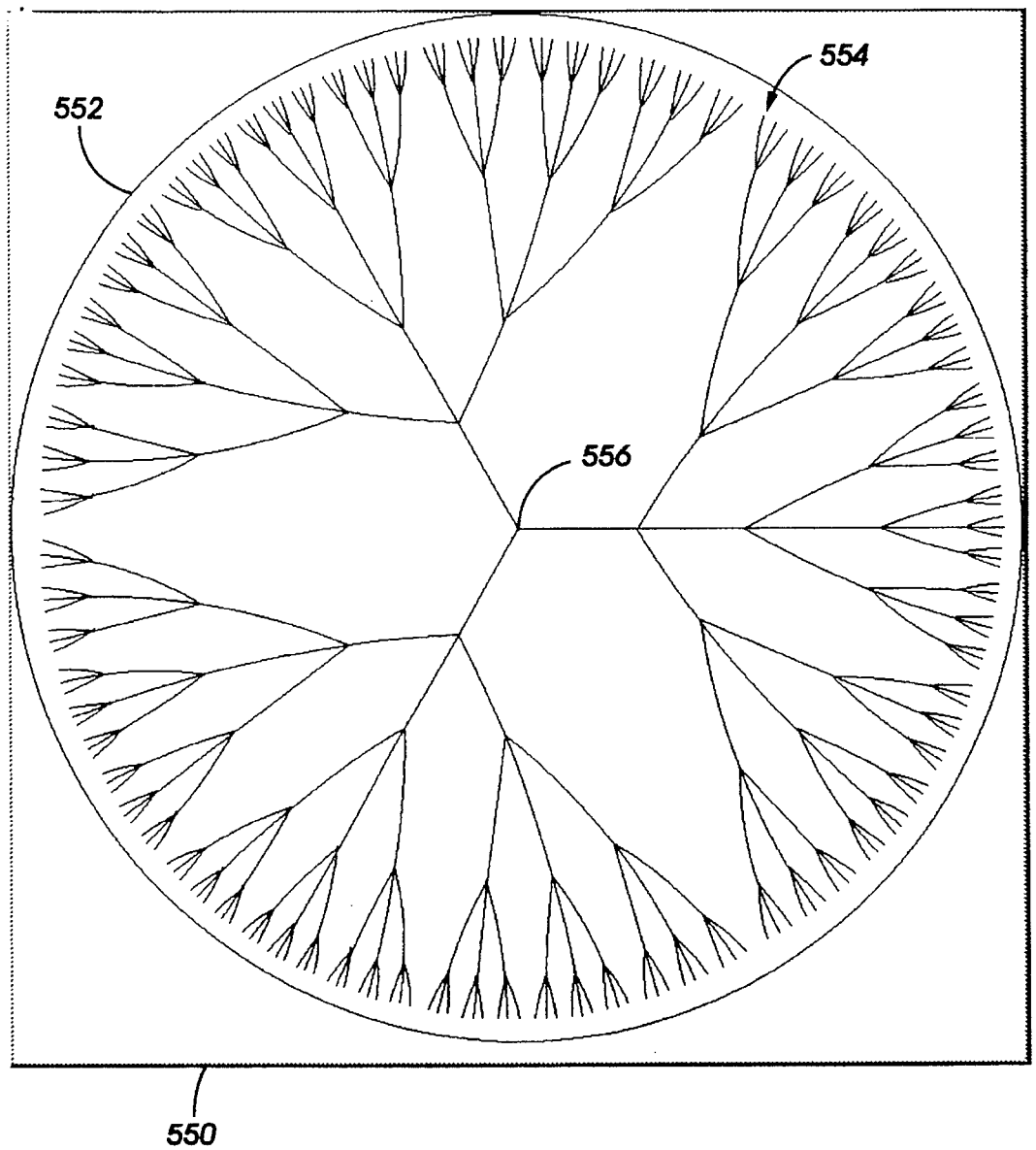
FIG. 14 shows an image produced by the technique of FIG. 13, with a representation of a uniform tree on a circular background with the root in a region of greater spacings at the center and with peripheral branches near the edge.
Figure 15:
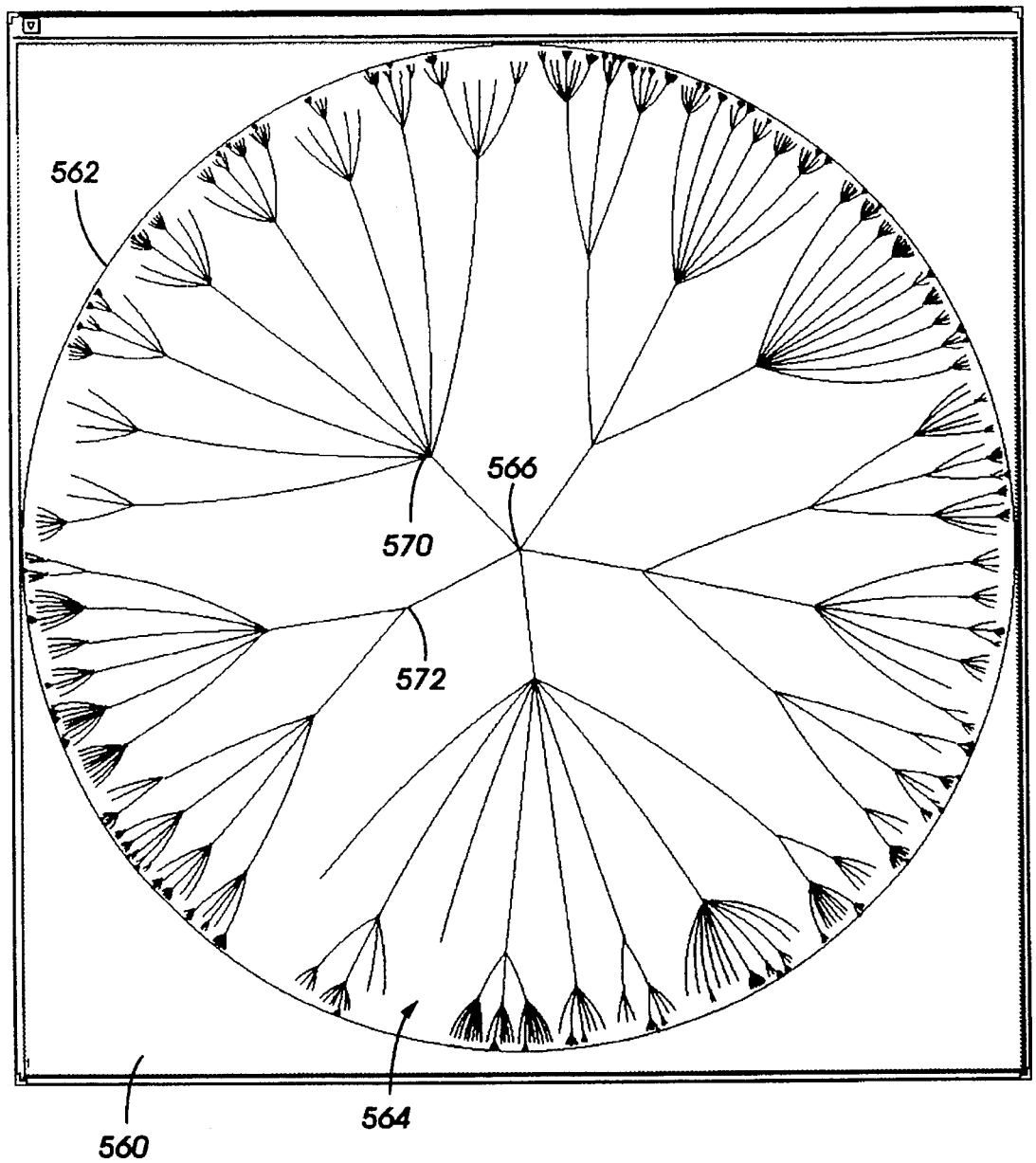
FIG. 15 shows another image produced by the technique of FIG. 13, with a representation of a non-uniform tree on a circular background with the root in a region of greater spacings at the center and with peripheral branches near the edge.
Figure 16:
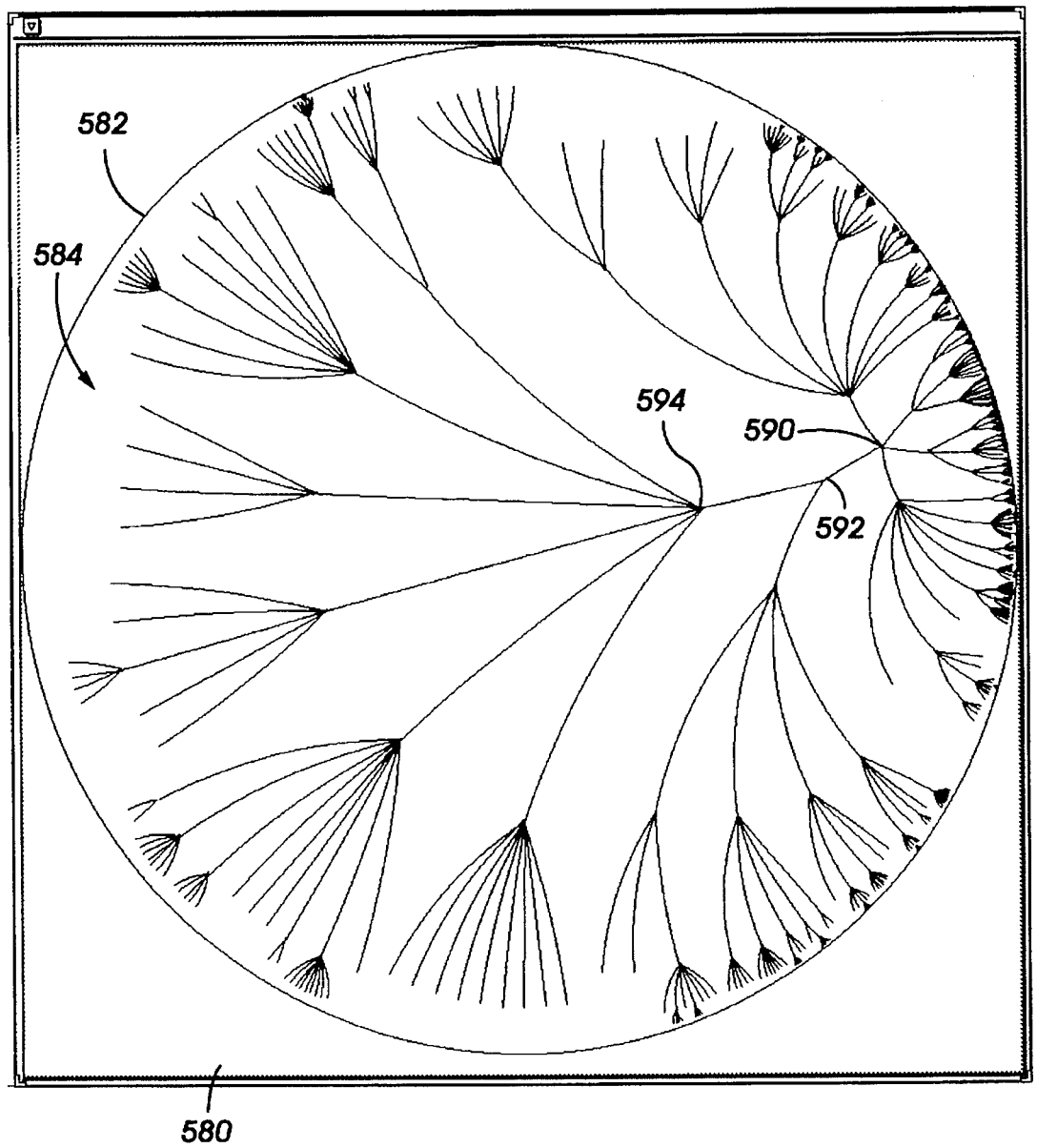
FIG. 16 shows another image produced by the technique of FIG. 13, with a representation of the same non-uniform tree as FIG. 15 but with a part other than the root in the region of greater spacings.
Figure 17:
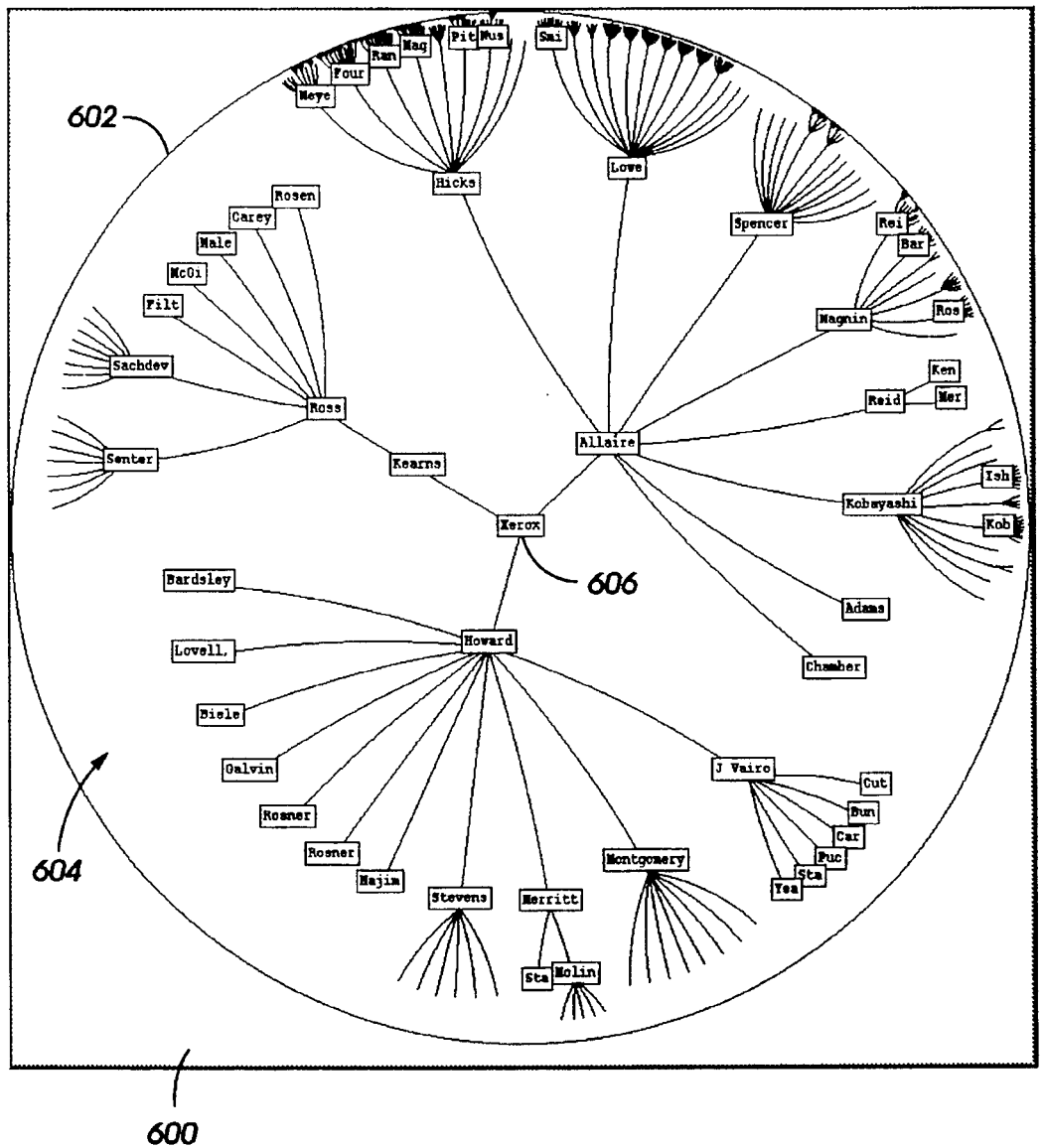
FIG. 17 shows another image produced by the technique of FIG. 13, with a representation of an organization chart with rectangular node features that include characters indicating content, with link features that are lines, and with the root at the center.
Figure 18:
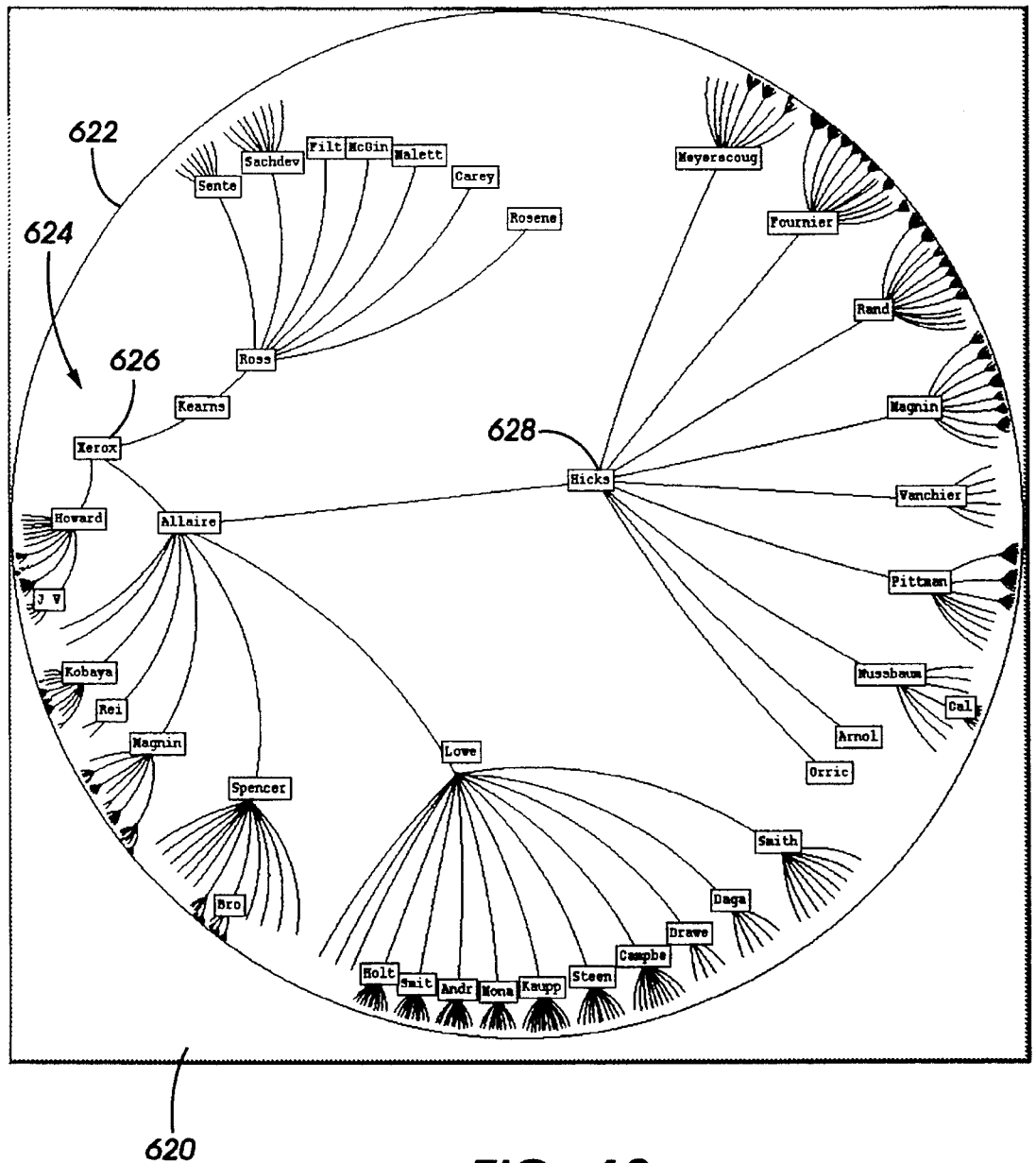
FIG. 18 shows another image produced by the technique of FIG. 13, with another representation of the organization chart represented in FIG. 17, but with children of the node nearest the center of the region of greater spacings at a rightward orientation from their parent.
Figure 19:
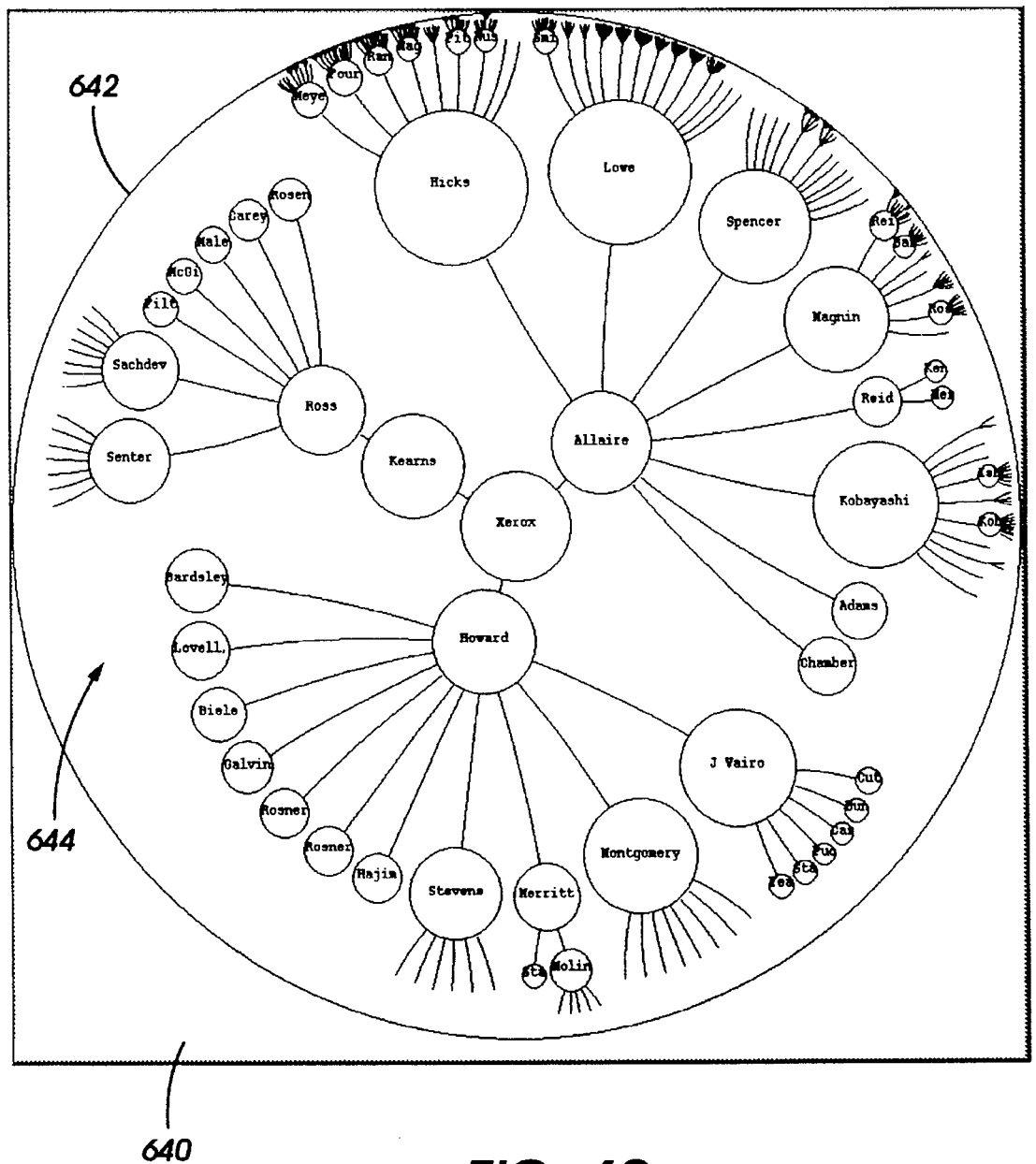
FIG. 19 shows another image produced by the technique of FIG. 13, a version of the representation in FIG. 17 with each node feature a circle indicating an area occupied by the node feature.
Figure 20:
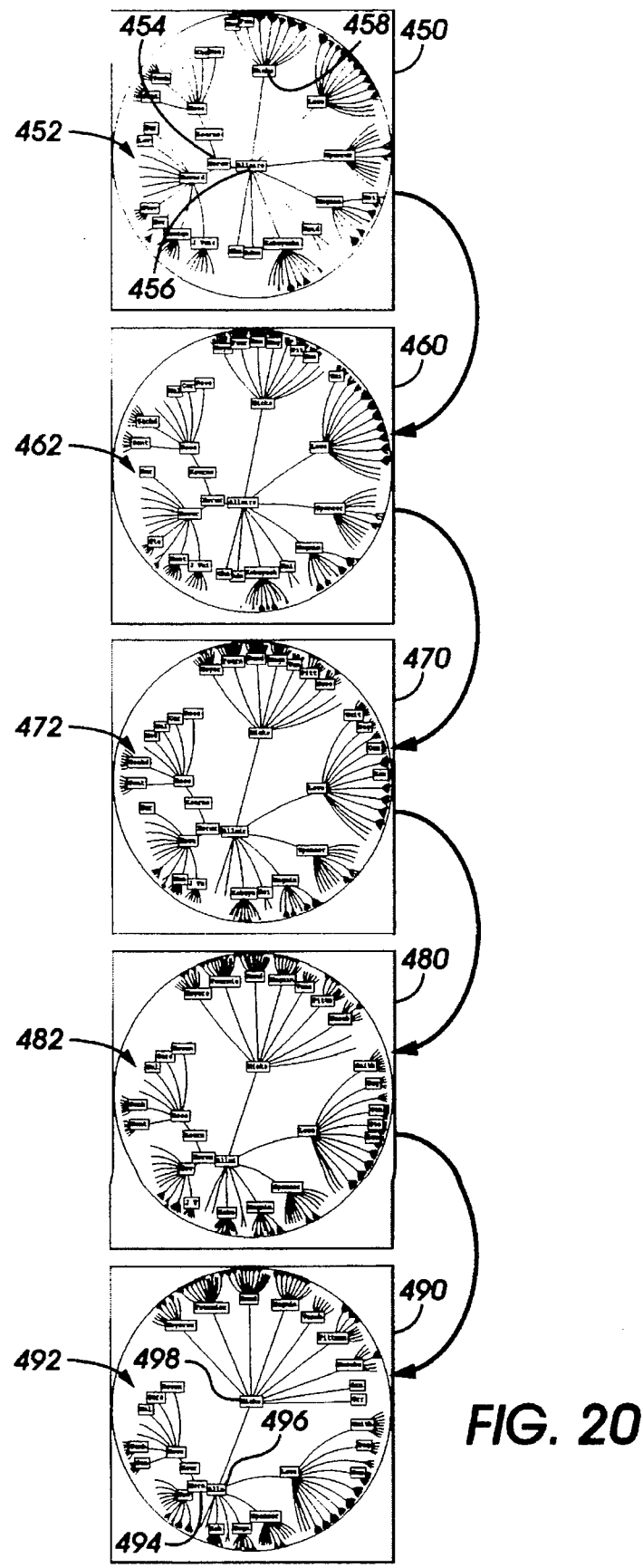
FIG. 20 shows a sequence of images produced by the technique of FIG. 8, with the images including representations that can produce a perception of continuous motion from one representation like that in FIG. 17 to another.
Figure 21:
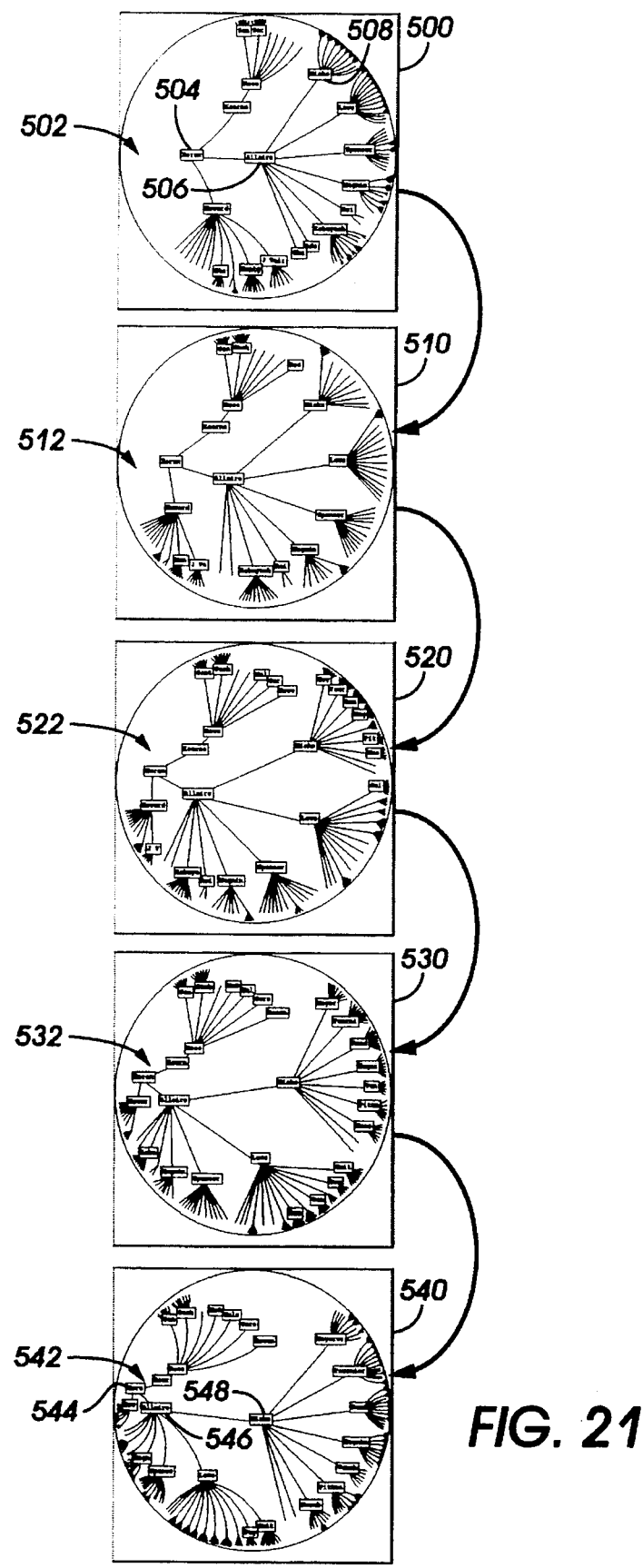
FIG. 21 shows another sequence of images produced by the technique of FIG. 8, with the images including representations that can produce a perception of continuous motion from one representation like that in FIG. 18 to another.

FIGS. 14–21 show examples of representations presented through techniques as described above. FIG. 14 shows a representation of a uniform tree on a circular background with the root in a region of greater spacings at the center and with peripheral branches near the edge. FIG. 15 shows a similar representation of a non-uniform tree. FIG. 16 shows a representation of the same non-uniform tree but with a part other than the root in the region of greater spacings. FIG. 17 shows a representation of an organization chart with rectangular node features that include characters indicating content, with link features that are lines, and with the root at the center. FIG. 18 shows another representation of the organization chart with children of a node at the center of a region of greater spacings at a rightward orientation from their parent. FIG. 19 shows a version of the representation in FIG. 17 with each node feature having a circular boundary. FIG. 20 shows a sequence of representations that can produce a perception of continuous motion from one representation like that in FIG. 17 to another. FIG. 21 shows a sequence of representations that can produce a perception of continuous motion from one representation like that in FIG. 18 to another.

FIG. 14 shows window 550 within which is presented background 552 and representation 554, which appears as a figure on background 552. Representation 554 includes link features that are lines representing links between nodes in a node-link structure and node features that are simply intersections or ends of lines. The represented node-link structure is a uniform tree of depth 5 and branching factor 3, with 364 nodes. The node features representing children of each node span about the same angle, except near root node feature 556, where a larger wedge was available initially.

FIG. 15 shows window 560 within which is presented background 562 and representation 564. Like representation 554, representation 564 includes link features that are lines and node features that are intersections or ends of lines. The represented node-link structure is a non-uniform tree with 1004 nodes and with a poisson distribution of children. As described above, for compactness, a sibling with a large number of descendants has more room than a sibling with few descendants, so that root node feature 566 has children with different nearest node spacings: compare child node feature 570, whose descendants span a larger angle, with child node feature 572, whose descendants span a smaller angle. As a result, grandchildren are more nearly the same distance from their grandparent than if the descendants of every parent spanned the same angle.

FIG. 16 shows window 580 within which is presented background 582 and representation 584. Representation 584 represents the same node-link structure as representation 564 in FIG. 15, but different node features are in the region of greater spacings. Root node feature 590, representing the same node as root node feature 566 in FIG. 15, has moved from the center of background 582 to a position near the edge. Child node feature 592, representing the same node as child node feature 572 in FIG. 15, has followed. And grandchild node feature 594 is closest to the center of background 582. In short, root node feature 590 is perceptible as a continuation of root node feature 566, but shifted to the right, so that the focus has shifted to a part of the node-link structure near grandchild node feature 594.

Despite their simplicity, FIGS. 14–16 also illustrate more spaced node features that determine a convex hull enclosing a region in which near neighbor spacings are in general perceptibly greater than outside the convex hull. FIGS. 14–16 also illustrate peripheral branches with children node features spaced from their parent node feature and from each other approximately along an arc so that the children node features are perceptible as a group of related node features.

FIGS. 17–21 show various representations of a node-link structure that is an organization chart. The data defining the node-link structure include, for each node, data indicating a name and other relevant information about the node, such as a division and a job title.

FIG. 17 shows window 600 within which is presented background 602 and representation 604, which appears as a figure on background 602. Representation 604 includes link features that are lines representing links between nodes in a node-link structure and node features, some of which are rectangles with characters in them, but others of which are intersections or ends of lines as in FIGS. 14–16. The rectangles with characters in them illustrate the result of loading a step that toggles the text variable in box 436 in FIG. 11. Root node feature 606 is at the center of a region of greater spacings in representation 604.

FIG. 18 shows window 620 within which is presented background 622 and representation 624. Representation 624 includes link features and node features as in FIG. 17, but children node features of a node at the center of the region of greater spacings have a rightward orientation from their parent. Root node feature 626 is not at the center of the region of greater spacings, but its grandchild node feature 628 is the node feature nearest the center of the region of greater spacings, so that its children node features fan out to the right of the region of greater spacings. FIG. 18 illustrates the result of loading a step that changes an orientation parameter, as in box 432 in FIG. 11.

FIG. 19 shows window 640 within which is presented background 642 and representation 644. Representation 644 includes link features as in FIG. 17, but its node features include circles with centered text in them rather than the rectangular node features in FIG. 17. Each circle approximates an area occupied by a node feature. FIG. 19 illustrates the result of loading a step that changes a wafers parameter, as in box 438 in FIG. 11.

FIG. 20 shows a sequence of windows, each with a background and a representation with root orientation preserved as in FIG. 17. FIG. 21 shows a similar sequence of windows, but with rightward orientation as in FIG. 18. When the windows of either figure are presented in sequence at an animation speed, they produce a perception that the representation in the first window is moved in such a way that nearest node spacings of some node features increase while nearest node spacings of other node features decrease. In each case, the technique of obtaining the nth root, described above in relation to FIG. 12, was used to obtain the intermediate representations between the first and last representations.

In window 450 in FIG. 20, representation 452 includes root node feature 454, near but not at the center of a region of greater spacings. Child node feature 456 is approximately at the center of the region of greater spacings. In windows 460, 470, 480, and 490, representations 462, 472, 482, and 492 respectively show node features representing the same node as child node feature 456 moving toward the edge of the background, while node features representing the same node as grandchild node feature 458 move toward the center of the region of greater spacings. In representation 492, root node feature 494 and child node feature 496 are very close together in the lower left of the background, while grandchild node feature 498 is approximately at the center of the region of greater spacings.

FIG. 20 also illustrates how orientation can be preserved. Orientation presents an interesting issue for the techniques of FIGS. 8–13, because things tend to get rotated due to the geometry of the hyperbolic plane. For example, most nodes rotate on the display during a pure translation. There is a line that doesn't rotate, but the farther nodes are on the display from that line, the more they rotate. This can be seen in the sequence of representations in FIG. 20. The node features representing the node named "Lowe", for example, begin in representation 452 with children fanned out to the upper right and end in representation 492 with children fanning out to the lower right. The rotations that occur during translations to and from the center, or near the center, of the region of greater spacings are reasonably intuitive. But if drags near the edge are interpreted as straight translations between the the source and the destination of the drag, then the line that doesn't rotate is near the edge, and the representation can do a counter-intuitive pirouette about the point being dragged.

A fundamental property of hyperbolic geometry causes the rotations and also causes another problem. In the usual Euclidean plane, if some graphical object is dragged around, but not rotated, and eventually dragged back to its original location, then it ends up at its original orientation—not rotated. But this is not true in the hyperbolic plane. A series of translations forming a closed loop, each preserving the orientation along the line of translation, will, in general, cause a rotation. In fact the amount of rotation is proportional to the area of the closed loop and is in the opposite direction to the direction the loop was traversed. This is also counter-intuitive, since if a user who browses around a node-link structure and then returns to the initial position finds features at the center of the region of greater spacings rotated, even though only translations were performed.

Both of these problems can be alleviated by interpreting the user's manipulations as a combination of both the most direct translation between the points the user specifies and an additional rotation around the point moved, so that the manipulations and their cumulative effects are more intuitive. The additional rotation is added in obtaining a transformation in box 410 in FIG. 10 or in box 470 in FIG. 12, as described in more detail in the Layout Application. From the user's perspective, drags and clicks move the point that the user is manipulating where expected. The additional rotation also appears natural, as it is designed to preserve some other property that the user expects. The user need not even be particularly aware that rotation is being added.

FIG. 20 illustrates a first technique for adding rotation. In this technique, rotations are added so that the original root node feature always keeps its original orientation on the display. In particular, the edges leaving it always leave in their original directions, as can be seen by comparing root node features 454 and 494. Preserving the orientation of the root node feature also means that a node feature currently in the center of the region of greater spacings also has the orientation it had in the original image.

This technique seems to give an intuitive behavior both for individual drags and for the cumulative effect of drags.

In window 500 in FIG. 21, representation 502 includes root node feature 504, near but not at the center of a region of greater spacings. Child node feature 506 is approximately at the center of the region of greater spacings, and its children, including grandchild node feature 508, are rightwardly oriented. In windows 510, 520, 530, and 540, representations 512, 522, 532, and 542 respectively show node features representing the same node as child node feature 506 moving toward the edge of the background, while node features representing the same node as grandchild node feature 508 move toward the center of the region of greater spacings. In representation 542, root node feature 544 and child node feature 546 are very close together in the center left of the background, while grandchild node feature 508 is approximately at the center of the region of greater spacings.

FIG. 21 illustrates a second technique for adding rotation, which explicitly does not preserve orientation. Instead, when a click indicates a part of the representation to be brought to the center of the region of greater spacings, the representation is rotated so that the children of the node feature nearest to the center of the region of greater spacings fan out in a canonical direction, such as to the right. Rightward orientation is also illustrated in FIG. 18, and FIG. 21 shows an animation sequence with rightward orientation. This technique is aided when the children of the root node are all laid out in the layout space on one side of the root node, so that the children node features of the root node feature can also fan out in the canonical direction when the root node feature is at the center of the region of greater spacings.

The sequences in FIGS. 20 and 21 were both obtained by responding to a click call as described above in relation to FIG. 12. In order to improve the perception of continuity from the first to last representations, the sequences can be presented at animation speeds, obtaining the intermediate representations by composing the nth root of the total translation with the previous representation's translator.

Responsive display performance is crucial to support interactive dragging of the structure and to support animated transitions on jump focus manipulation in response to a click. Speed of presentation can be a problem for large node-link structures on standard hardware. We achieve quick redisplay on standard hardware by reducing level of detail during animation and interactive dragging. Fortunately, the level of detail can be reduced without significantly affecting the perception of continuous motion. FIG. 21 shows an animation sequence in which level of detail is reduced in intermediate representations. Unless one looks closely, it is easy not to notice the missing details during motion.

One way to reduce detail is to draw less of the fringe in intermediate representations. Even the full quality display routine stops drawing the fringe once it gets below one pixel resolution, because one pixel resolution gives an absolute bound on rendering complexity, no matter how big the node-link structure. For animation, pruning of node features near the edge of the background can be strengthened in box 510 in FIG. 13, so that node features are not drawn for descendants of nodes within some small border inside the edge of the layout space. This technique tremendously increases display performance, since the vast majority of nodes are very close to the edge. But this technique does not significantly degrade the perception of continuous motion because the pruned nodes occupy only a small fraction of the display, and not a part on which the user is typically focusing.

Another way to reduce detail is to draw link features as straight lines rather than arcs, as described above in relation to box 440 in FIG. 11 and as illustrated in the intermediate representations in FIG. 21. In the environments in which the invention has currently been implemented, drawing arcs turns out to be several times more expensive than drawing straight lines, and sometimes many times more expensive. It is not clear whether this is a necessary cost of drawing arcs or it is just that arcs have not been optimized as well as straight lines. In either case, this expense can be avoided during animation by drawing straight lines rather than arcs. While arcs give a more pleasing and intuitive static display, they aren't as important during animation. This appears to be both because the difference between arcs and straight lines is not as apparent in the presence of motion, and because the user's attention during motion tends to be focused near the center of the representation, where the arcs are already almost straight.

One other possible way to reduce detail is to drop text during animation, as described above in relation to box 434 in FIG. 11. This is, however, a significant distraction. And text display during animation has not been a performance problem.

These reductions in detail provide options for use in a system that automatically adjusts rendering quality during animation as described in copending coassigned U.S. patent application Ser. No. 07/814,138, entitled "Avoiding Oscillation in Interactive Animation," incorporated herein by reference, and in Tang, S. H. and Linton, M. A., "Pacers: Time-elastic objects," *Proceedings of the ACM Symposium on User Interface Software and Technology,* ACM Press, Nov. 1993, pp. 35–43.

In summary, presentation of sequences of node-link structure representations like those in FIGS. 20 and 21 is based on techniques that provide a smooth blending of focus and context and continuous repositioning of focus. The techniques can be implemented by laying out a node-link structure in a uniform way on a hyperbolic plane and mapping this plane onto a circular display region. The projection onto the unit disk provides a natural mechanism for assigning more space to a portion of the hierarchy while still embedding it in the context of the entire hierarchy. Translating the structure on the hyperbolic plane provides a mechanism for controlling which portion of the structure receives the most display space without compromising the illusion of viewing the entire tree. The focus can be effectively manipulated using pointer clicks as well as interactive dragging. Transitions across such manipulation can be smoothly animated.

The techniques are well suited for visualizing trees. A tree can be initially displayed with a node feature representing its root at the center of the region of greater spacings, but the representation can be smoothly transformed to bring other node features to the center of the region of greater spacings, as illustrated in FIGS. 20 and 21. The context always includes several generations of parents, siblings, and children, making it easier for the user to explore the hierarchy without getting lost.

C.5. Variations

The implementations described above could be varied in many ways within the scope of the invention.

The implementations described above have been successfully executed on Sun SPARCStation workstation and an Apple Macintosh personal computer, but implementations could be executed on other machines.

The implementations described above have been successfully executed using the Common Lisp programming environment on both the Macintosh and Unix programming platforms, but other programming environments could be used, including non-object-oriented environments, and other platforms could be used, such as Windows.

The implementations described above operate on node-link data defining an organization chart, but could operate on node-link data defining any appropriate node-link structure. For example, the node-link data could define all web pages of a network within some limits, and could be obtained by converting the web pages to a tree using an appropriate pruning constraint.

The implementations described above rely on techniques described in the Layout Application using hyperbolic geometry and layout in a hyperbolic plane. Other implementations of the invention could perform conformal mapping or other mappings without using hyperbolic geometry and with layout in a space other than the hyperbolic plane.

The implementations described above present a representation in a circular display region, but a representation could be presented in any other appropriately shaped display region, such as an ellipse, through an appropriate mapping from the hyperbolic plane. The implementations described above show node features that are rectangular or circular and link features that are lines such as arcs or straight lines, but representations could be presented with other types of node and link features. For example, greater use of display space may be obtained with oval or oblong node features that extend into otherwise unused display areas. Furthermore, the region assigned to a node in a hyperbolic plane or other layout space could have a non-circular shape.

The implementations described above receive user signals that are provided by activating keyboard and mouse buttons. The invention could be implemented to receive user signals that are provided in other ways, such as by using user input circuitry other than a keyboard and a mouse.

The implementations described above receive user signals indicating a dragging and clicking to bring a position to the origin. The invention could be implemented to receive user signals of other types, including signals requesting other changes in position of a node-link structure in a layout space.

The implementations described above show representations with a single region of greater spacings, but representations could be presented with two or more regions of greater spacings, to focus on more node features. A dual focus technique is described in the Layout Application.

The implementations described above preserve arcs, but arcs need not be preserved.

The implementations described above provide a continuous transition from the region of greater spacings to other regions of a representation, but an edge, a corner, or another non-continuous transition could be included in a representation. For example, the region of greater spacings could be a square forming the top of a pyramid, with the peripheral branches being presented on sides that recede from the region of greater spacings.

The implementations described above reduce detail during animation by limiting the presentation of node features at the edge of the representation and by presenting lines as straight lines rather than curved lines; then, when the animation is completed, the above implementations lock into a full detail representation. As described above, detail could also be reduced in other ways, such as by reducing the amount of text presented or by reducing the number of lines drawn. In addition, detail could be automatically adjusted based on rendering time, avoiding oscillation with the techniques as described in copending coassigned U.S. patent application Ser. No. 07/814,138, entitled "Avoiding Oscillation in Interactive Animation," incorporated herein by reference. The full detail version could also be presented in a series of substeps to bridge the transition from low to high detail.

The implementations described above reduce detail by limiting presentation of node features, and visual indications could be provided indicating positions of nodes that are invisible because of the resolution limit.

The implementations described above could be modified to use different sizes of node feature areas; to let the user dynamically adjust the trade-off between size and packing of node feature areas and number of visible nodes; and to use color and other cues to aid the user in understanding and navigating the node-link structure.

The implementation described above in relation to FIGS. 8–13 implements the technique in FIG. 6. The invention could be implemented according to the technique in FIG. 7, however, or in other ways to provided a browser interface.

In the implementations described above, acts are performed in an order that could be modified in many cases.

The implementations described above use currently available computing techniques, but could readily be modified to use newly discovered computing techniques as they become available.

D. Application

The invention could be applied in many ways, including to provide a browser for organization charts, file system hierarchies, hypertext hierarchies, world wide web connectivity structures, parts breakdowns, SGML structures, or any other large node-link structures. The browser could be used in editing structures or their contents.

E. Source Code Cross-Reference

Source code that implements some of the features described above is in Appendices A–C of the Layout Application. The code in the Layout Application, when executed on a Sun SPARCStation, generally follows the implementation described in relation to FIGS. 8–13 above, presenting representations as in FIGS. 14–21 above. Nonetheless, the code may differ from the above description in various ways. For example, the code may be divided into procedures or routines differently than described above.

The source code entitled animation-flame.lisp and hb-frame.lisp together implement browser interface program 234 in FIG. 8. Code in animation-flame.lisp extends the standard CLIM implementation to provide double-buffered animation and an animation queue.

The method animate-io in hb-frame.cl implements the acts in box 334 in FIG. 8. The method draw-io in hb-frame.cl implements the acts in box 336, as shown in more detail in FIG. 13. The function make-display-tree in hb-math.cl implements the acts in FIG. 9. The method pointer-motion in hb-frame.cl implements the acts in FIG. 10. The method key-press in hb-frame.cl implements the acts in FIG. 11. The method button-click in hb-frame.cl implements the acts in FIG. 12. Other functions and methods are called by these functions and methods as indicated in the code.

F. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method comprising:

obtaining node-link data defining a node-link structure; the node-link structure including nodes and links, each link relating at least two of the nodes; and using the node-link data to present a sequence of representations of the node-link structure on a display; the sequence beginning with a first representation and ending with a last representation; the last representation being perceptible as a changed continuation of the first representation;

each representation in the sequence including bounded node features representing nodes in the node-link structure; each bounded node feature having a center of area that has a nearest node spacing from a nearest other node feature's center of area; each bounded node feature's center of area and nearest node spacing defining a mid-spacing circle for the node feature that is centered at the center of area and has a diameter equal to the nearest node spacing;

the mid-spacing circles of the bounded node features in each representation together determining a first convex hull for the representation, each representation's first convex hull enclosing a total area for the representation;

the bounded node features of each representation including a subset of more spaced node features, the mid-spacing circles of the more spaced node features determining a second convex hull for the representation, each representation's second convex hull enclosing approximately half the representation's total area and enclosing a region in which bounded node features have nearest node spacings that are in general perceptibly greater than in a region enclosed by the first convex hull but outside the second convex hull;

the nodes represented in each representation forming at least one peripheral branch, each peripheral branch including a top level and at least one lower level, the top level including a top level node and the lower levels including lower level nodes that are not in the representation's subset of more spaced node features, each node at each lower level having a parent node at a next higher level to which the node is related through one link;

lower level node features that share a parent node feature having centers of area positioned in order approximately along an arc with sufficiently similar spacings from the center of area of the parent node feature and with sufficiently similar spacings from adjacent node features along the arc that the lower level node features sharing the parent node feature are perceptible as a group of related node features;

the second convex hulls of the first and last representations including subsets of bounded node features that represent different sets of nodes; the sequence of representations producing a perception that at least one bounded node feature has a nearest node spacing that increases from the first representation to the last representation and that at least one other bounded node feature has a nearest node spacing that decreases from the first representation to the last representation.

2. The method of claim 1 in which each representation is perceptible as a figure on a background; the last representation's background being perceptible as a changed continuation of the first representation's background.

3. The method of claim 2 in which the each representation's background has a central area; each representation's region in which bounded node features have nearest node spacings that are in general perceptibly greater being presented in the central area of the representation's background.

4. The method of claim 2 in which each representation's background is circular.

5. The method of claim 1 in which each link in the node-link structure relates a pair of the nodes in the node-link structure; each representation including a link feature extending between each pair of node features that represent nodes that are related by a link in the node-link structure.

6. The method of claim 5 in which the link features are lines.

7. The method of claim 1 in which the node-link data include content data indicating content for each node; each node feature in the subset of more spaced node features including a graphical feature indicating the content of the node it represents.

8. The method of claim 7 in which the graphical feature includes characters indicating content.

9. The method of claim 1 in which the node-link structure is an acyclic graph.

10. The method of claim 9 in which the node-link structure is a tree.

11. The method of claim 1 in which the act of using the node-link data to present representations of the node-link structure in sequence on a display comprises:

using the node-link data to obtain first node position data indicating positions for nodes represented by node features in the first representation;

using the first representation data to present the first representation on the display; and for each representation following the first, an iteration that comprises:

using a preceding representation's node position data to obtain the following representation's node position data indicating positions for nodes represented by node features in the following representation; and using the following representation's node position data to present the following representation on the display.

12. The method of claim 11 in which the act of using the preceding representation's node position data to obtain the following representation's node position data comprises performing a conformal mapping of the positions indicated by the preceding representation's node position data.

13. The method of claim 1 in which the act of using the node-link data to present representations of the node-link structure in sequence on a display comprises:

using the node-link data to obtain first node position data indicating positions for nodes represented by node features in the first representation;

using the first representation data to present the first representation on the display; and for each representation following the first, an iteration that comprises:

using the first node position data to obtain the following representation's node position data indicating positions for nodes represented by node features in the following representation; and using the following representation's node position data to present the following representation on the display.

14. The method of claim 1 in which the sequence of representations includes two or more intermediate representations between the first and last representations; each of a subsequence of the intermediate representations including a first node feature that represents a first node; the act of using the node-link data to present a sequence of representations comprising:

presenting the subsequence of intermediate representations at a sufficient speed that the first node features are perceptible as a continuously moving feature.

15. The method of claim 14 in which the first and last representations are presented with a first level of detail; at least one of the subsequence of intermediate representations being presented with a second level of detail below the first level so that speed of presentation is maintained.

16. A method of operating a machine; the machine including:

memory;

user input circuitry for providing data indicating signals from a user;

a display; and a processor connected for accessing data stored in the memory, for receiving data indicating signals from the user input circuitry, and for providing data to the display to cause presentation of images; and node-link data stored in the memory; the node-link data defining a node-link structure that includes two or more nodes and one or more links, each link relating at least two of the nodes;

the method comprising:

operating the processor to use the node-link data to provide first representation data to the display causing the display to present a first representation of the node-link structure;

receiving user signal data from the user input circuitry indicating a signal from a user; the signal indicating a change in the first representation; and operating the processor to respond to the user signal data by automatically providing following representation data to the display causing the display to present a sequence of at least one following representation of the node-link structure; the sequence ending with a last representation; the sequence of at least one following representation being presented such that the last representation is perceptible as a changed continuation of the first representation;

the first representation and each following representation including bounded node features representing nodes in the node-link structure; each bounded node feature having a center of area that has a nearest node spacing from a nearest other node feature's center of area; each bounded node feature's center of area and nearest node spacing defining a mid-spacing circle for the node feature that is centered at the center of area and has a diameter equal to the nearest node spacing;

the mid-spacing circles of the bounded node features in each representation together determining a first convex hull for the representation, each representation's first convex hull enclosing a total area for the representation;

the bounded node features of each representation including a subset of more spaced node features, the mid-spacing circles of the more spaced node features determining a second convex hull for the representation, each representation's second convex hull enclosing approximately half the representation's total area and enclosing a region in which bounded node features have nearest node spacings that are in general perceptibly greater than in a region enclosed by the first convex hull but outside the second convex hull;

the nodes represented in each representation forming at least one peripheral branch, each peripheral branch including a top level and at least one lower level, the top level including a top level node and the lower levels including lower level nodes that are not in the representation's subset of more spaced node features, each node at each lower level having a parent node at a next higher level to which the node is related through one link;

lower level node features that share a parent node feature having centers of area positioned in order approximately along an arc with sufficiently similar spacings from the center of area of the parent node feature and with sufficiently similar spacings from adjacent node features along the arc that the lower level node features sharing the parent node feature are perceptible as a group of related node features;

the second convex hulls of the first and last representations including subsets of bounded node features that represent different sets of nodes; the sequence of representations producing a perception that at least one bounded node feature has a nearest node spacing that increases from the first representation to the last representation and that at least one other bounded node feature has a nearest node spacing that decreases from the first representation to the last representation.

17. The method of claim 16 in which the act of operating the processor to respond to the user signal data comprises a series of iterations; each iteration comprising:

operating the processor to automatically provide intermediate representation data to the display causing the display to present a following representation of the node-link structure intermediate between the first and last representations;

the following representations of the iterations being perceptible as intermediate changed continuations of the first representation so that the last representation is perceptible as a changed continuation of the first representation.

18. The method of claim 16 in which the user input circuitry comprises a pointer control device that controls a pointer presented on the display; the signal from the user including a button click while the pointer is at a position in the first representation that is outside the first representation's inner convex hull.

19. The method of claim 18 in which the signal from the user further includes an action moving the pointer.

20. A machine comprising:

memory;

user input circuitry for providing data indicating signals from a user;

a display;

a processor connected for accessing data stored in the memory, for receiving data indicating signals from the user input circuitry, and for providing data to the display to cause presentation of images;

node-link data stored in the memory; the node-link data defining a node-link structure that includes two or more nodes and one or more links, each link relating at least two of the nodes; and program data stored in the memory; the program data indicating instructions the processor executes; the processor, in executing the instructions:

using the node-link data to provide first representation data to the display causing the display to present a first representation of the node-link structure;

receiving user signal data from the user input circuitry indicating a signal from a user; the signal indicating a change in the first representation; and responding to the user signal data by automatically providing following representation data to the display causing the display to present a sequence of at least one following representation of the node-link structure; the sequence ending with a last representation; the sequence of at least one following representation being presented such that the last representation is perceptible as a changed continuation of the first representation;

the first representation and each following representation including bounded node features representing nodes in the node-link structure; each bounded node feature having a center of area that has a nearest node spacing from a nearest other node feature's center of area; each bounded node feature's center of area and nearest node spacing defining a mid-spacing circle for the node feature that is centered at the center of area and has a diameter equal to the nearest node spacing;

the mid-spacing circles of the bounded node features in each representation together determining a first convex hull for the representation, each representation's first convex hull enclosing a total area for the representation;

the bounded node features of each representation including a subset of more spaced node features, the mid-spacing circles of the more spaced node features determining a second convex hull for the representation, each representation's second convex hull enclosing approximately half the representation's total area and enclosing a region in which bounded node features have nearest node spacings that are in general perceptibly greater than in a region enclosed by the first convex hull but outside the second convex hull;

the nodes represented in each representation forming at least one peripheral branch, each peripheral branch including a top level and at least one lower level, the top level including a top level node and the lower levels including lower level nodes that are not in the representation's subset of more spaced node features, each node at each lower level having a parent node at a next higher level to which the node is related through one link;

lower level node features that share a parent node feature having centers of area positioned in order approximately along an arc with sufficiently similar spacings from the center of area of the parent node feature and with sufficiently similar spacings from adjacent node features along the arc that the lower level node features sharing the parent node feature are perceptible as a group of related node features;

the second convex hulls of the first and last representations including subsets of bounded node features that represent different sets of nodes; the sequence of representations producing a perception that at least one bounded node feature has a nearest node spacing that increases from the first representation to the last representation and that at least one other bounded node feature has a nearest node spacing that decreases from the first representation to the last representation.

21. An article of manufacture for use in a machine that includes:

memory;

user input circuitry for providing data indicating signals from a user;

a display;

a storage medium access device;

a processor connected for accessing data stored in the memory, for receiving data indicating signals from the user input circuitry, for providing data to the display to cause presentation of images, and for receiving data from the storage medium access device; and node-link data stored in the memory; the node-link data defining a node-link structure that includes two or more nodes and one or more links, each link relating at least two of the nodes;

the article of manufacture comprising:

a storage medium that can be accessed by the storage medium access device; and instruction data stored by the storage medium; the instruction data comprising data units stored in positions by the storage medium so that the storage medium access device provides the data units to the processor in a sequence in which the data units indicate instructions the processor executes; the processor, in executing the instructions:

using the node-link data to provide first representation data to the display causing the display to present a first representation of the node-link structure;

receiving user signal data from the user input circuitry indicating a signal from a user; the signal indicating a change in the first representation; and responding to the user signal data by automatically providing following representation data to the display causing the display to present a sequence of at least one following representation of the node-link structure; the sequence ending with a last representation; the sequence of at least one following representation being presented such that the last representation is perceptible as a changed continuation of the first representation;

the first representation and each following representation including bounded node features representing nodes in the node-link structure; each bounded node feature having a center of area that has a nearest node spacing from a nearest other node feature's center of area; each bounded node feature's center of area and nearest node spacing defining a mid-spacing circle for the node feature that is centered at the center of area and has a diameter equal to the nearest node spacing;

the mid-spacing circles of the bounded node features in each representation together determining a first convex hull for the representation, each representation's first convex hull enclosing a total area for the representation;

the bounded node features of each representation including a subset of more spaced node features, the mid-spacing circles of the more spaced node features determining a second convex hull for the representation, each representation's second convex hull enclosing approximately half the representation's total area and enclosing a region in which bounded node features have nearest node spacings that are in general perceptibly greater than in a region enclosed by the first convex hull but outside the second convex hull;

the nodes represented in each representation forming at least one peripheral branch, each peripheral branch including a top level and at least one lower level, the top level including a top level node and the lower levels including lower level nodes that are not in the representation's subset of more spaced node features, each node at each lower level having a parent node at a next higher level to which the node is related through one link;

lower level node features that share a parent node feature having centers of area positioned in order approximately along an arc with sufficiently similar spacings from the center of area of the parent node feature and with sufficiently similar spacings from adjacent node features along the arc that the lower level node features sharing the parent node feature are perceptible as a group of related node features;

the second convex hulls of the first and last representations including subsets of bounded node features that represent different sets of nodes; the sequence of representations producing a perception that at least one bounded node feature has a nearest node spacing that increases from the first representation to the last representation and that at least one other bounded node feature has a nearest node spacing that decreases from the first representation to the last representation.

22. A method of operating a first machine that includes:

first memory;

a first connection to a network;

a first processor connected for accessing data stored in the first memory and for establishing connections with other machines over the network through the first connection; and instruction data stored in the first memory; the instruction data indicating instructions that can be executed by a second machine, the second machine including:

second memory;

user input circuitry for providing data indicating signals from a user;

a display;

a second connection to the network;

a second processor connected for accessing data stored in the memory, for receiving data indicating signals from the user input circuitry, for providing data to the display to cause presentation of images, and for establishing connections with other machines over the network through the second connection; and node-link data stored in the second memory; the node-link data defining a node-link structure that includes nodes and links, each link relating at least two of the nodes;

the method comprising:

operating the first processor to establish a connection to the second processor over the network through the first and second connections; and operating the first processor to transfer the instruction data over the network to the second processor so that the second processor can store the instruction data in the second memory and can execute the instructions indicated by the instruction data; the second processor, in executing the instructions indicated by the instruction data:

using the node-link data to provide first representation data to the display causing the display to present a first representation of the node-link structure;

receiving user signal data from the user input circuitry indicating a signal from a user; the signal indicating a change in the first representation; and responding to the user signal data by automatically providing following representation data to the display causing the display to present a sequence of at least one following representation of the node-link structure; the sequence ending with a last representation; the sequence of at least one following representation being presented such that the last representation is perceptible as a changed continuation of the first representation;

the first representation and each following representation including bounded node features representing nodes in the node-link structure; each bounded node feature having a center of area that has a nearest node spacing from a nearest other node feature's center of area; each bounded node feature's center of area and nearest node spacing defining a mid-spacing circle for the node feature that is centered at the center of area and has a diameter equal to the nearest node spacing;

the mid-spacing circles of the bounded node features in each representation together determining a first convex hull for the representation, each representation's first convex hull enclosing a total area for the representation;

the bounded node features of each representation including a subset of more spaced node features, the mid-spacing circles of the more spaced node features determining a second convex hull for the representation, each representation's second convex hull enclosing approximately half the representation's total area and enclosing a region in which bounded node features have nearest node spacings that are in general perceptibly greater than in a region enclosed by the first convex hull but outside the second convex hull;

the nodes represented in each representation forming at least one peripheral branch, each peripheral branch including a top level and at least one lower level, the top level including a top level node and the lower levels including lower level nodes that are not in the representation's subset of more spaced node features, each node at each lower level having a parent node at a next higher level to which the node is related through one link;

lower level node features that share a parent node feature having centers of area positioned in order approximately along an arc with sufficiently similar spacings from the center of area of the parent node feature and with sufficiently similar spacings from adjacent node features along the arc that the lower level node features sharing the parent node feature are perceptible as a group of related node features;

the second convex hulls of the first and last representations including subsets of bounded node features that represent different sets of nodes; the sequence of representations producing a perception that at least one bounded node feature has a nearest node spacing that increases from the first representation to the last representation and that at least one other bounded node feature has a nearest node spacing that decreases from the first representation to the last representation.

* * * * *